(12) United States Patent
Tanaka

(10) Patent No.: US 8,767,736 B2
(45) Date of Patent: Jul. 1, 2014

(54) COMMUNICATION DEVICE, COMMUNICATION METHOD, AND RECORDING MEDIUM FOR RECORDING COMMUNICATION PROGRAM

(75) Inventor: Hiroshi Tanaka, Tokyo (JP)

(73) Assignee: Nec Corporation, Tokyo (JP)

( * ) Notice: Subject to any disclaimer, the term of this patent is extended or adjusted under 35 U.S.C. 154(b) by 315 days.

(21) Appl. No.: 13/198,341

(22) Filed: Aug. 4, 2011

(65) Prior Publication Data
US 2012/0033671 A1 Feb. 9, 2012

(30) Foreign Application Priority Data
Aug. 9, 2010 (JP) ................................ 2010-178797

(51) Int. Cl.
H04L 12/28 (2006.01)
H04L 1/00 (2006.01)
H04J 1/16 (2006.01)
H04J 3/14 (2006.01)
G01R 31/08 (2006.01)

(52) U.S. Cl.
USPC ............ 370/392; 370/229; 370/231; 370/389

(58) Field of Classification Search
None
See application file for complete search history.

(56) References Cited

U.S. PATENT DOCUMENTS

2004/0218550 A1* 11/2004 Kim .............................. 370/254
2007/0076618 A1* 4/2007 Hirose ........................... 370/249
2009/0067325 A1* 3/2009 Baratakke et al. ............ 370/229
2009/0323608 A1* 12/2009 Adachi et al. ................. 370/329

FOREIGN PATENT DOCUMENTS

JP 2004-349958 A 12/2004
JP 2006-340119 A 12/2006
JP 2007180686 A 7/2007
JP 4340300 B 10/2009

OTHER PUBLICATIONS

Japanese Office Action for JP Application No. 2010-178797 mailed on Apr. 8, 2014 with partial English Translation.

* cited by examiner

*Primary Examiner* — Hassan Phillips
*Assistant Examiner* — Lonnie Sweet
(74) *Attorney, Agent, or Firm* — Sughrue Mion, PLLC

(57) ABSTRACT

A communication device including: a transfer unit transferring a received frame based on an identifier included in the received frame; a calculation unit calculating a size of the received frame to which the identifier is added when the received frame is a specific frame; a notification unit adding a value indicating a transmittable size or a size less than the transmittable size, when the size of the received frame after the identifier added is larger than the size that can be transmitted to a next destination communication device on a communication path, generating a transmission impossible notification frame addressed to a source communication device of the received frame, and transferring the transmission impossible notification frame to the transfer unit; and a retransmission unit correcting the size of the specific frame to be smaller than or equal to the transmittable size, when the transmission impossible notification frame is received and transferring the transmission impossible notification frame to the transfer unit.

17 Claims, 17 Drawing Sheets

Fig.10

TABLE OF COMMUNICATION DEVICE 20

MTU MANAGEMENT TABLE 26

| PATH/PORT | PATH MTU/MTU |
|---|---|
| 27 | 1500 |
| 28 | 1500 |

LSP LABEL TABLE 222

| INPUT LABEL | OUTPUT LABEL | PROCESS | PORT |
|---|---|---|---|
| C | E | Push | 28 |
| B | D' | Push | 27 |
| D | D' | Swap | 27 |

MEP TABLE 24

| PATH | MEP ID | OPPOSITE MEP ID | PW LABEL |
|---|---|---|---|
| 71 | – | M1 | B |

TABLE OF COMMUNICATION DEVICE 10

MTU MANAGEMENT TABLE 16

| PATH/PORT | PATH MTU/MTU |
|---|---|
| 61 | 1496 → Update to 1492 |
| 17 | 1500 → Update to 1474 |
| 18 | 1500 |

PW LABEL TABLE 121

| HEADER | PORT | PW LABEL |
|---|---|---|
| X | 17 | A |
| Y | 17 | B |

LSP LABEL TABLE 122

| INPUT LABEL | OUTPUT LABEL | PROCESS | PORT |
|---|---|---|---|
| A | C | Push | 18 |
| D' | – | Pop | – |

MEP TABLE 14

| PATH | MEP ID | OPPOSITE MEP ID | PW LABEL |
|---|---|---|---|
| 61 | M1 | M2 | A |

Fig.11

TABLE OF COMMUNICATION DEVICE 30

MTU MANAGEMENT TABLE 36

| PATH/PORT | PATH MTU/MTU |
|---|---|
| 37 | 1500 |
| 38 | 1500 → Update to 1474 |

PW LABEL TABLE 321

| HEADER | PORT | PW LABEL |
|---|---|---|
| X | 38 | A |

LSP LABEL TABLE 322

| INPUT LABEL | OPPOSITE MEP ID | OUTPUT LABEL | PROCESS | PORT |
|---|---|---|---|---|
| E | C | — | Pop | — |
| B | — | D | Push | 37 |

MEP TABLE 34

| PATH | MEP ID | OPPOSITE MEP ID | PW LABEL |
|---|---|---|---|
| 71 | — | M1 | B |

COMMUNICATION DEVICE, COMMUNICATION METHOD, AND RECORDING MEDIUM FOR RECORDING COMMUNICATION PROGRAM

This application is based upon and claims the benefit of priority from Japanese Patent Application No. 2010-178797, filed on Aug. 9, 2010, the disclosure of which is incorporated herein in its entirety by reference.

TECHNICAL FIELD

The present invention relates to a communication device having a function for maintaining and managing a network, a communication method, and a recording medium for recording a communication program.

BACKGROUND ART

In recent years, the MPLS-TP (Multiprotocol Label Switching-Transport Profile) technology has been standardized by the IETF (Internet Engineering Task Force) as a new packet transport technology.

The MPLS-TP aims to realize a packet transport network most suitable for providing a packet service in the transport network based on SONET (Synchronous Optical Network)/SDH (Synchronous Digital Hierarchy) technology. The MPLS-TP is composed of a subset function extracted from the existing MPLS (Multiprotocol Label Switching) technology and a newly added function.

A network architecture of the MPLS-TP is composed of three Planes: Data-Plane (D-Plane), Management-Plane (M-Plane), and Control-Plane (C-Plane). In the M-Plane, monitor, control, and the like of a device and an LSP (Label Switch Path) of which the MPLS-TP network is composed are performed. In the C-Plane, set-up, maintenance, and the like of the LSP which is not controlled by the M-Plane are performed by a signaling between the devices. In the D-Plane, data transfer is performed according to a label switching process and an encapsulation process of the existing MPLS. Further, the D-Plane has a function for maintaining and managing a network that is called OAM (Operations, Administration, and Maintenance).

The MPLS-TP is an architecture in which these three Planes are logically or physically separated from each other and the D-Plane operates independently of the C/M-Planes. By using this architecture, the MPLS-TP removes dependency on an IP (Internet Protocol) layer and complexity, and ensures robustness required for the transport network. The OAM of the existing MPLS is dependent on the IP layer. Therefore, a new OAM function that is not dependent on the IP layer is added to the OAM function of the D-Plane of the MPLS-TP.

The MPLS-TP has a hierarchical structure of three layers. First, a transport layer of the MPLS-TP is called Transport Network Layer. The Transport Network Layer is configured by using the MPLS technology conforming to the IETF standard and a PWE3 (Pseudo Wire Emulation Edge to Edge) technology with which a virtual Point-to-Point path is formed on an MPLS network. The upper layer of the Transport Network Layer is called a Client Layer and various layer technologies can be applied to the Client Layer by the PWE3 technology. Further, the lower layer of the Transport Network Layer is called a Server Layer and in the Server Layer, the various layer technologies can be used for transmission between nodes in the MPLS-TP network like the existing MPLS.

In the MPLS-TP network that is composed of a device having the MPLS-TP function, by the PWE3 technology and the MPLS technology, two hierarchical end-to-end paths (PW path and LSP path) are established between LERs (Label Edge Routers) that are edge nodes of the network. A frame received from the Client Layer is encapsulated with two MPLS labels (PW label and LSP label) in two stages and transferred on the path. By performing the MPLS label stacking in a specific section of the path, hierarchization is additionally performed in the LSP path and whereby, monitor, maintenance, and the like of the section can be performed by the OAM function.

As mentioned above, when the hierarchization is additionally performed in the LSP path in the specific section of the path by the OAM function, and the monitoring and maintenance of the section is performed, a method for discovering an MTU (Maximum Transmission Unit) when transmitting the OAM frame remains as an issue. Further, the MTU is a maximum value of an amount of data that can be transferred at one time.

A packet transfer operation in a case mentioned above is shown in FIG. 16 and FIG. 17. In FIG. 16, a PW path 61 and an LSP path 41 are established between a communication device 10 and a communication device 30. An LSP path 81 for monitoring is further established in a section between a communication device 20 and the communication device 30 at a different hierarchical level. When a packet is transmitted in the section of the LSP path 81, a MPLS label is stacked. In this case, the MPLS label is a label indicating that the packet has passed through the LSP path 81 for monitoring.

An example of the packet transfer operation in a network shown in FIG. 16 is shown in FIG. 17. In FIG. 17, both the Client Layer and the Server Layer are Ethernet (registered trademark). It is assumed that the MTU of the data link between the communication device 10 and the communication device 20 is 1500 bytes and the MTU of the data link between the communication device 20 and the communication device 30 is also 1500 bytes.

First, in the communication device 10, by using the PWE3 technology, all the fields excluding an FCS (Frame Check Sequence) of an Ethernet frame received by the Client Layer are encapsulated with the PW label and the LSP label. It is assumed that the MTU of the Client Layer is set to 1478 bytes in consideration of the encapsulation.

Hereinafter, in a case in which the communication device 10 receives the Ether frame whose payload size is 1478 bytes, operation of the communication device 10 will be described in detail. First, the communication device 10 receives the Ether frame with a payload of 1478 bytes from the Client Layer (FIG. 17 (1)). The Ether frame is encapsulated with the PW label and the LSP label (FIG. 17 (2)). The Ether header is 14 bytes. The PW label and the LSP label are 4 bytes, respectively. Therefore, the Ether frame is 1500 bytes. The Ether header of the Server Layer is added to this Ether frame and the Ether frame with a payload of 1500 bytes is transferred (FIG. 17 (3)). The MTU between the communication device 10 and the communication device 20 is 1500 bytes. Therefore, this Ether frame can reach the communication device 20.

In the communication device 20, the Ether header of the Server Layer of the received Ether frame is removed. Next, it is recognized that a next forwarding destination of the Ether frame is the communication device 30. In order to forward the Ether frame to the communication device 30, the Ether frame has to pass through the LSP path 81 for monitoring. Therefore, the LSP label is further added (FIG. 17 (4)). Because this LSP label is 4 bytes, the Ether frame transmitted from the communication device 20 has the payload of 1504 bytes (FIG. 17 (5)).

Here, the MTU between the communication device 20 and the communication device 30 is 1500 bytes. Therefore, the Ether frame exceeds the MTU and whereby, the Ether frame cannot be transferred to the communication device 30.

Thus, it cannot be known by a transmission source node (in the above-mentioned example, the communication device 10) of the path that the frame size increases because of the excessive label stacking that is performed in the path beyond the expectation. Accordingly, a problem in which even it is not at the end of the path, the Ether frame that exceeds the MTU is transmitted and whereby, the end-to-end transfer of the Ether frame cannot be performed occurs.

In an IP layer, a Path MTU Discovery protocol described in patent literature 1 is used to solve a similar problem. The Path MTU Discovery protocol operates in the IP layer when a communication device (router) receives the frame that exceeds the MTU value. The communication device stores the appropriate MTU value in a destination unreachable notification (Destination Unreachable Message) of an ICMP (Internet Control Message Protocol) and sends it to the transmission source of the frame as a reply. When the communication device that is the transmission source of the frame receives the destination unreachable notification, it automatically performs correction so as to update the MTU value with the value described in the destination unreachable notification.

A technology with which a CC (Continuity Check) function of the Ether OAM recommended by IEEE 802.1ag or ITU-T Y.1731 is used is disclosed in patent literature 2. Specifically, a method in which a frame is transmitted while changing a size of a CCM (Continuity Check Message) frame by 1 byte for each frame and the communication device which receives the CCM checks the length of the reached/unreached frame is disclosed. By using this method, the length of the frame of which the end-to-end transfer cannot be performed can be detected.

CITATION LIST

Patent Literature

[patent literature 1] Japanese Patent Application Laid-Open No. 2007-180686
[patent literature 2] Japanese Patent Publication No. 4340300

SUMMARY

An example of an object of the present invention is to obtain an end-to-end MTU value of a communication path with high accuracy and at high speed.

A communication apparatus according to an exemplary aspect of the invention includes a transfer unit transferring a received frame based on an identifier included in the received frame; a calculation unit calculating a size of the received frame to which the identifier is added when the received frame is a specific frame; a notification unit adding a value indicating a transmittable size or a size less than the transmittable size, when the size of the received frame after the identifier added is larger than the size that can be transmitted to a next destination communication device on a communication path, generating a transmission impossible notification frame addressed to a source communication device of the received frame, and transferring the transmission impossible notification frame to the transfer unit; and a retransmission unit correcting the size of the specific frame to be smaller than or equal to the transmittable size, when the transmission impossible notification frame is received and transferring the transmission impossible notification frame to the transfer unit.

A communication method according to an exemplary aspect of the invention includes transferring a received frame based on an identifier included in the received frame; calculating a size of the received frame to which the identifier is added when the received frame is a specific frame; adding a value indicating a transmittable size or a size less than the transmittable size, when the size of the received frame after the identifier added is larger than the size that can be transmitted to a next destination communication device on a communication path; generating a transmission impossible notification frame addressed to a source communication device of the received frame and transferring the transmission impossible notification frame; and correcting the size of the specific frame to be smaller than or equal to the transmittable size, when the transmission impossible notification frame is received and transferring the transmission impossible notification frame.

A recording medium having recorded thereon a communication program according to an exemplary aspect of the invention includes a transfer process transferring a received frame based on an identifier included in the received frame; a calculation process calculating a size of the received frame to which the identifier is added when the received frame is a specific frame; a notification process adding a value indicating a transmittable size or a size less than the transmittable size, when the size of the received frame after the identifier added is larger than the size that can be transmitted to a next destination communication device on a communication path, generating a transmission impossible notification frame addressed to a source communication device of the received frame, and transferring the transmission impossible notification frame by a transfer process; and a retransmission process correcting the size of the specific frame to be smaller than or equal to the transmittable size, when the transmission impossible notification frame is received and transferring the transmission impossible notification frame in the transfer process.

BRIEF DESCRIPTION OF THE DRAWINGS

Exemplary features and advantages of the present invention will become apparent from the following detailed description when taken with the accompanying drawings in which:

FIG. 10 is a diagram showing a table held by a communication device of a first exemplary embodiment;

FIG. 11 is a diagram showing a table held by a communication device of a first exemplary embodiment;

EXEMPLARY EMBODIMENT

Hereinafter, an exemplary embodiment of the present invention will be described with reference to drawings.

First Exemplary Embodiment

Configuration and Outline of Operation

Figure 1:
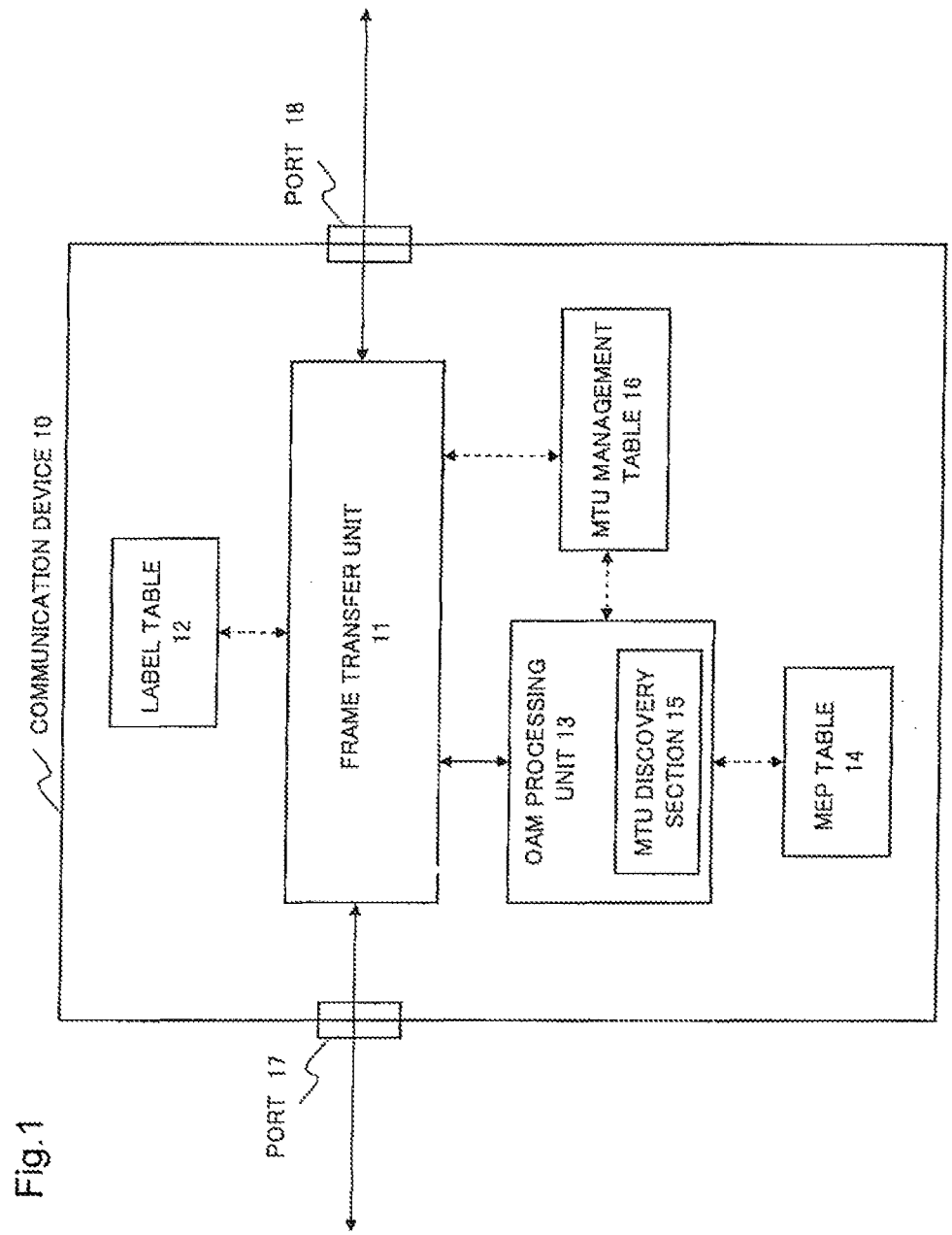
FIG. 1 is a block diagram showing a configuration of a communication device of a first exemplary embodiment.

FIG. 1 is a block diagram showing a configuration of a communication device of a first exemplary embodiment of the present invention. A communication device 10 shown in FIG. 1 includes a frame transfer unit 11, a label table 12, an OAM processing unit 13, a MEP table 14, an MTU discovery section 15, an MTU management table 16, a port 17, and a port 18. Further, each function will be described in detail later.

Figure 3:
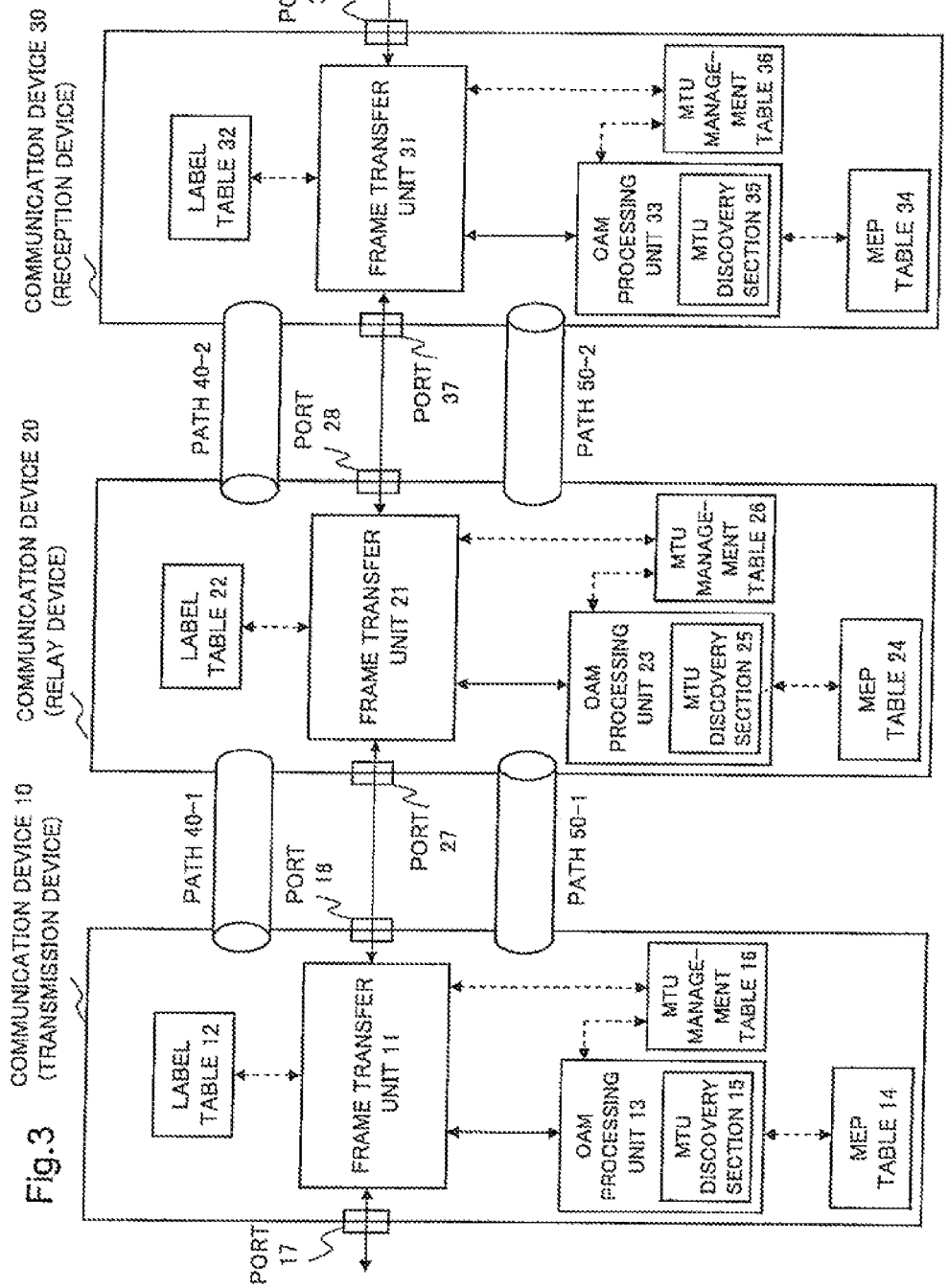
FIG. 3 is a block diagram showing an outline of a first exemplary embodiment.

FIG. 3 is a block diagram showing an MPLS-TP network which is composed of the communication device shown in FIG. 1. The MPLS-TP network shown in FIG. 3 includes three communication devices: the communication device 10, the communication device 20, and the communication device 30. Further, all the communication devices have the same configuration as the communication device 10 shown in FIG. 1.

Each communication device can operate as a transmission device, a relay device, or a reception device. The communication devices are connected through a transmission medium. In the MPLS-TP network, the communication device 10 and the communication device 30 are connected via the relay device, and a logical path 40 and a logical path 50 are set in-between.

Specifically, a path 40-1 and a path 50-1 are set between the communication device 10 and the communication device 20. Further, a path 40-2 and a path 50-2 are set between the communication device 20 and the communication device 30.

The path 40-1 and the path 40-2 are used when a traffic is transferred in a direction from the communication device 10 (transmission side) to the communication device 30 (reception side). The path 50-1 and the path 50-2 are used when a traffic is transferred in a direction from the communication device 30 (reception side) to the communication device 10 (transmission side).

The communication device 10 and the communication device 20 are connected by the transmission medium of the Server Layer, and the communication device 20 and the communication device 30 are connected by the transmission medium of the Server Layer. On the other hand, the communication device 10 and a communication device (not shown in FIG. 3) that exists outside the MPLS-TP network are connected by the transmission medium of the Client Layer. Also, the communication device 30 and a communication device (not shown in FIG. 3) that exists outside the MPLS-TP network are connected by the transmission medium of the Client Layer.

Further, in the network shown in FIG. 3, only one relay device that is the communication device 20 is used. However, a plurality of relay devices may be used in the MPLS-TP network in a similar fashion.

Furthermore, in the network shown in FIG. 3, the communication device 10 operates as the transmission device and the communication device 30 operates as the reception device. However, the use of each communication device is not limited to the above-mentioned use. In other words, the communication device 10 may be operated as the reception device and the communication device 30 may be operated as the transmission device.

Each function of the communication device 10 will be described in detail below. Further, because the function of the communication device 20 and the communication device 30 is the same as that of the communication device 10, the description of them will be omitted.

Figure 8:
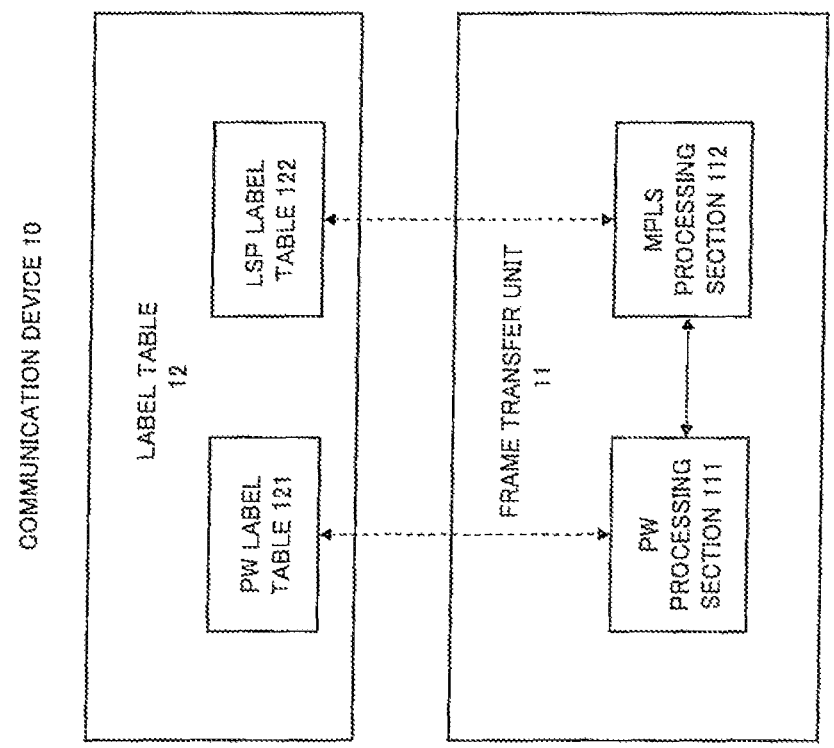
FIG. 8 is a block diagram showing a configuration of a communication device of a first exemplary embodiment.

First, the frame transfer unit 11 and the label table 12 will be described in detail with reference to FIG. 8 and FIG. 9.

The frame transfer unit 11 includes a PW processing section 111 and an MPLS processing section 112. The PW processing section 111 and the MPLS processing section 112 perform a label process conforming to the existing PWE3 standards and the existing MPLS standards, respectively. The label process includes for example, label search, label addition (Push), label removal (Pop), and label replace (Swap). Further, an MTU check of a transmission and reception frame by referring to the MTU management table 16, identification of the user data frame and the OAM frame, and addition and removal of the header of the transmission medium at the Server Layer and the Client Layer are included.

Figure 9:
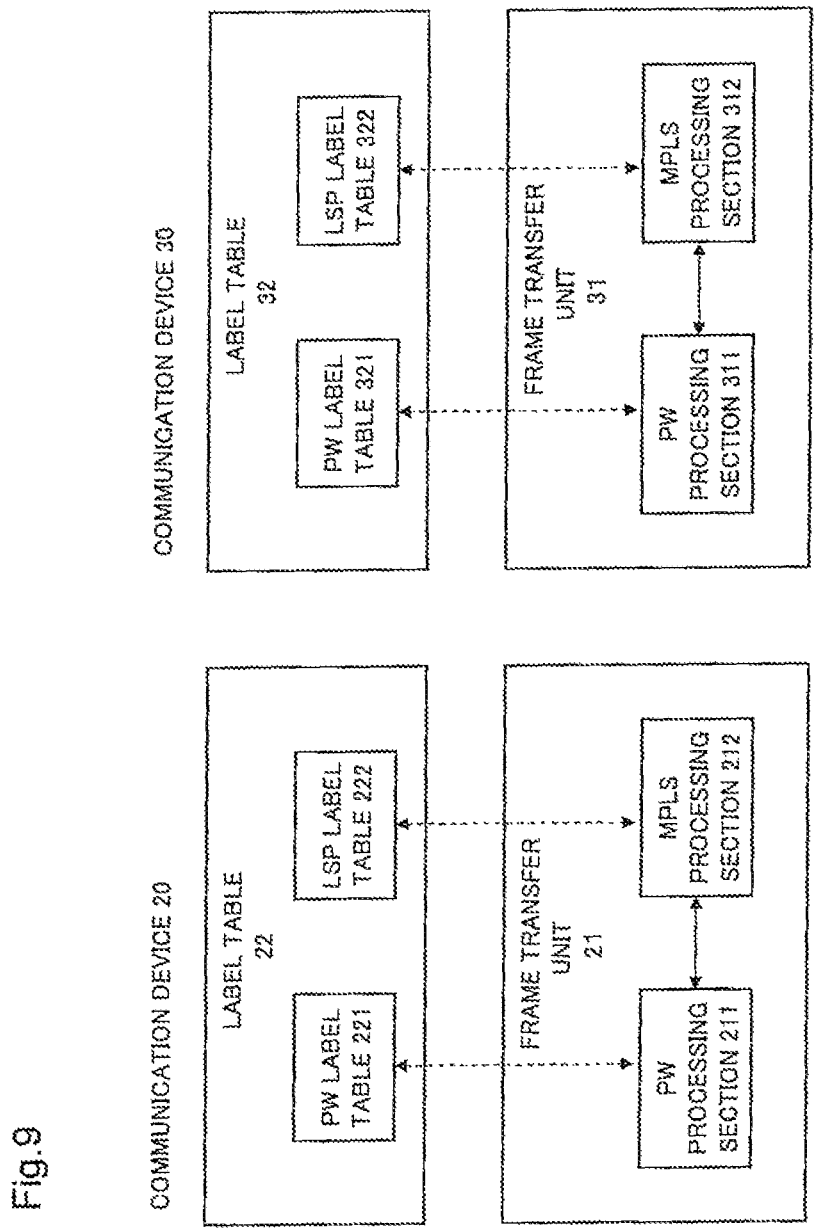
FIG. 9 is a block diagram showing a configuration of a communication device of a first exemplary embodiment.

Further, as shown in FIG. 9, the communication device 20 and the communication device 30 include PW processing sections 211 and 311, and MPLS processing sections 212 and 312 like the communication device 10, respectively.

The label table 12 includes a PW label table 121 and an LSP label table 122. The PW label table 121 has an entry in which information on the header of the frame and the port is associated with information on the PW label and the PW processing section 111 refers to this table. The LSP label table 122 has an entry in which information on an input label and information on an output label, a processing action of the label, and the output port are associated with each other and the MPLS processing section 112 refers to this table.

An example of a configuration of the PW label table 121 and the LSP label table 122 is shown in FIG. 10 and FIG. 11. Further, as shown in FIG. 9, the communication device 20 and the communication device 30 include PW label tables 221 and 321 and LSP label tables 222 and 322 like the communication device 10, respectively.

The OAM processing unit 13 generates the OAM frame and terminates it. Specifically, it has a function to perform a path MTU discovery in addition to a standard OAM function defined in the MPLS-TP standards.

Here, the path MTU indicates an MTU required for the end-to-end communication of a certain path. A process for an MTU confirmation/response frame is performed via the MTU discovery section 15 having the path MTU discovery function.

Figure 2:
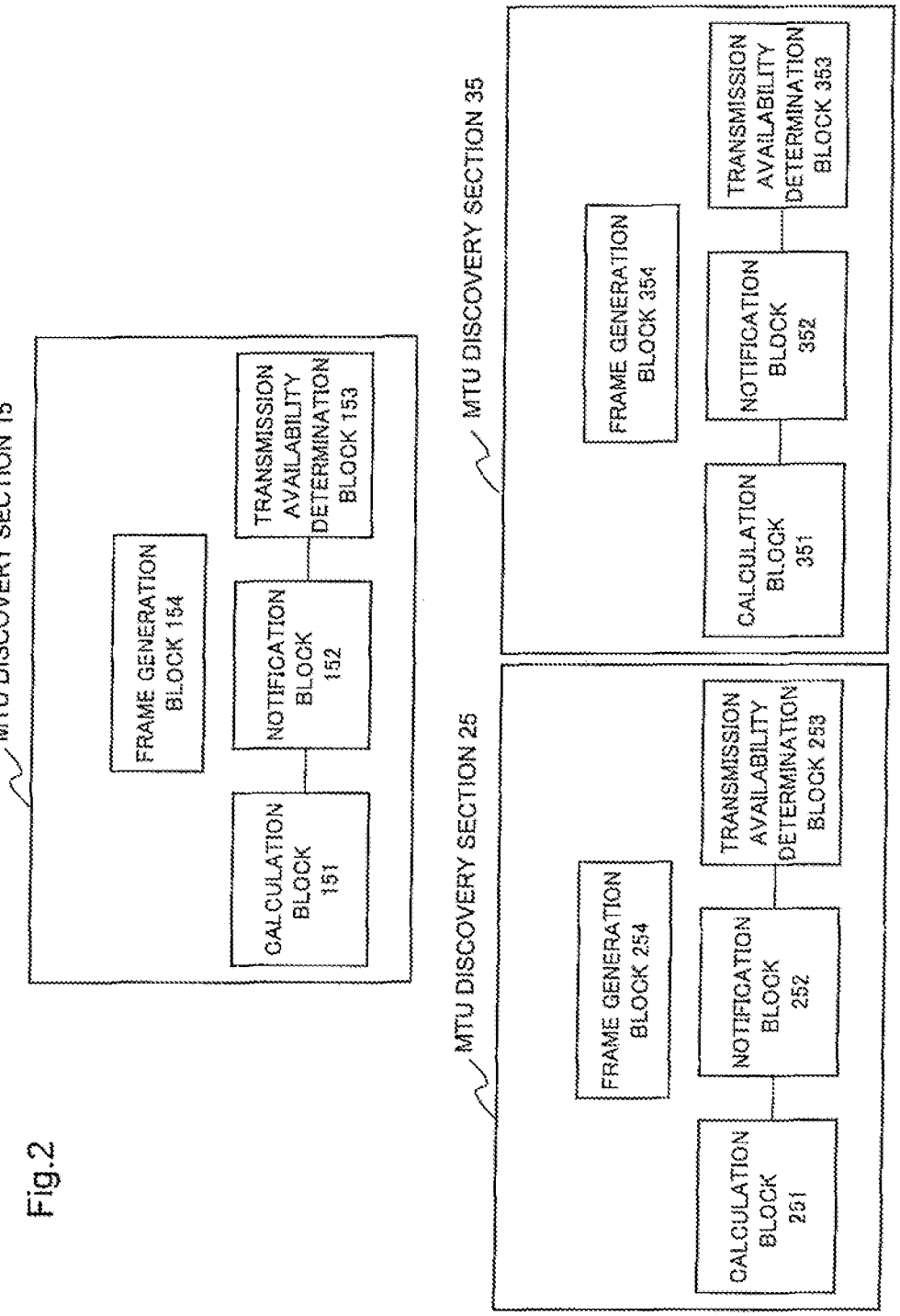
FIG. 2 is a block diagram showing a configuration of an MTU discovery section of a first exemplary embodiment.

FIG. 2 is a block diagram showing a detailed configuration of an MTU discovery section 15 of the communication device 10, an MTU discovery section 25 of the communication device 20, and an MTU discovery section 35 of the communication device 30. The MTU discovery section 15 of the communication device 10 includes a calculation block 151, a notification block 152, a transmission availability determination block 153, and a frame generation block 154. Similarly, the MTU discovery section 25 of the communication device 20 includes a calculation block 251, a notification block 252, a transmission availability determination block 253, and a frame generation block 254. The MTU discovery section 35 of the communication device 30 includes a calculation block 351, a notification block 352, a transmission availability determination block 353, and a frame generation block 354. A configuration and operation of the MTU discovery section 25 and the MTU discovery section 35 are similar to those of the MTU discovery section 15. Therefore, the description of them will be omitted appropriately.

The MTU discovery section 15 operates in a different fashion according to the role assigned to the communication device 10, such as the transmission device, the relay device, or the reception device. Hereinafter, the outline of the operation of the exemplary embodiment will be described, wherein it is assumed that the communication device 10 is the transmission device, the communication device 20 is the relay device, and the communication device 30 is the reception device.

First, in the communication device 10 (transmission device) that is an end point node of the path, the OAM processing unit 13 generates an MTU confirmation frame having a specific frame size and transmits it to the communication device 30 (reception device).

In the communication device 20 (relay device), the transmission availability determination block 253 determines whether the received MTU confirmation frame exceeds the MTU. When it is determined that the MTU confirmation frame exceeds the MTU, the notification block 252 generates an MTU response frame indicating that a frame is non-transferable and adds information on a transferable frame size. The notification block 252 transmits the MTU response frame indicating that a frame is non-transferable to the communication device 10 as a reply.

When the MTU confirmation frame reaches the communication device 30 without exceeding the MTU, the notification block 352 in the communication device 30 transmits an MTU response frame indicating that a frame is transferable to the communication device 10 as a reply. In each communication device, information about the MTU obtained by these processes is registered in a "path MTU" column of the MTU management tables 16, 26 and 36. The calculation block 151 of the communication device 10 which receives the MTU response frame indicating that a frame is non-transferable from the relay device 20 extracts the information on the transferable frame size stored in the received frame. The frame generation block 154 generates the MTU confirmation frame whose size is transferable and transmits it to the communication device 30 again. By repeating this confirmation/response process, the transferable frame size (path MTU) is discovered for the end-to-end path (from the communication device 10 to the communication device 30).

The entries for an identifier of the MEP and an identifier of an opposite MEP that are defined at the end points of the path and label information on the path that has to be added to the OAM frame which are associated with each other are entered in the MEP (Maintenance End Point) table 14 and the OAM processing unit 13 refers to this table.

The entries for the port connected to the transmission medium at the Client/Server Layer, the MTU thereof, the identifier of the path, and the path MTU thereof which are associated with each other are entered in the MTU management table 16.

An example of a configuration of the MEP table 14 and the MTU management table 16 is shown in FIG. 10 and FIG. 11.

DETAILED DESCRIPTION OF THE OPERATION

Operation of each communication device of the first exemplary embodiment of the present invention will be described in detail below.

Figure 4:
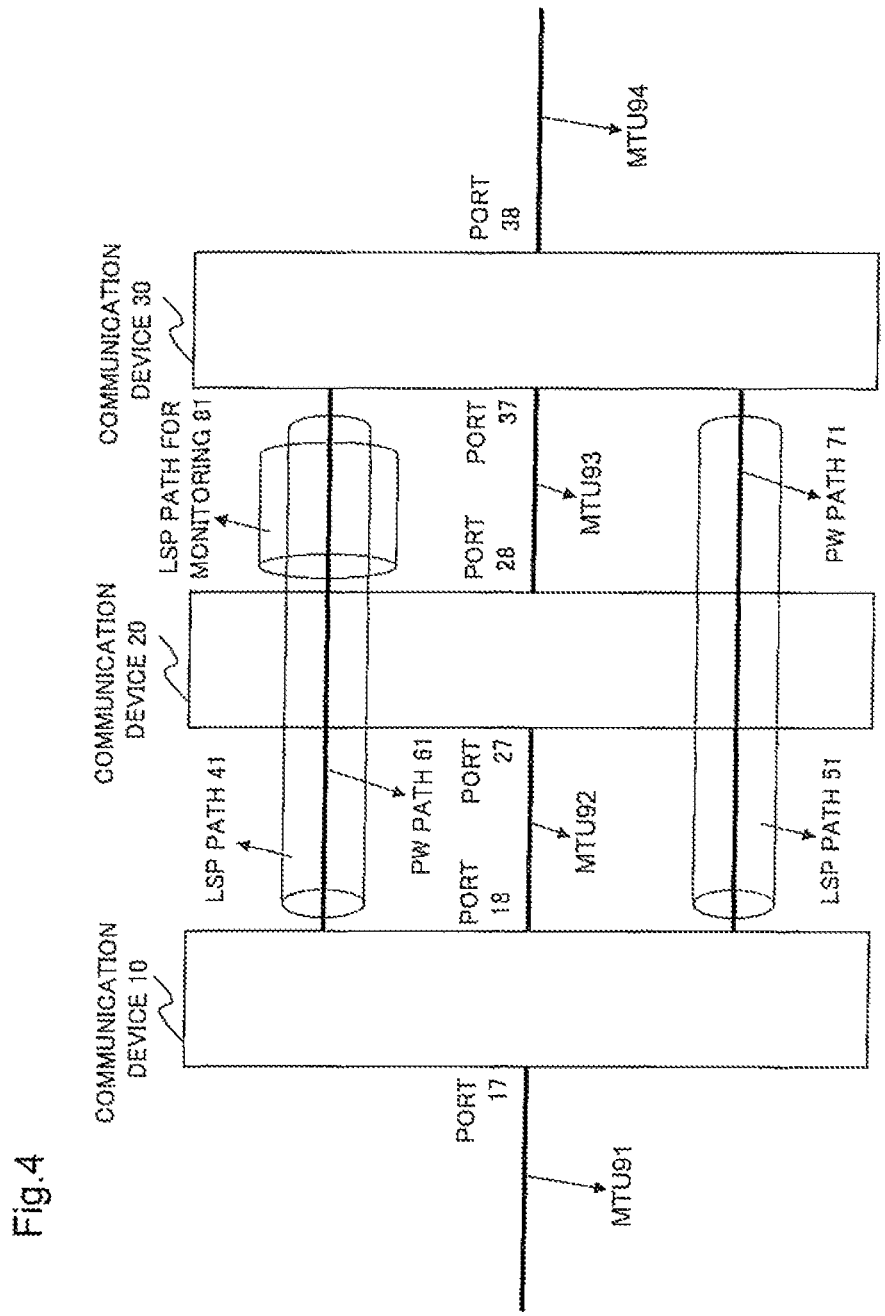
FIG. 4 is a diagram showing an outline of operation of a first exemplary embodiment.

FIG. 4 is a diagram showing the MPLS-TP network which is composed of the communication device shown in FIG. 1.

In the network shown in FIG. 4, the communication devices 10, 20 and 30 are connected to each other with the transmission medium through the ports 18, 27, 28 and 37. The communication devices 10 and 30 are connected to an external network through the ports 17 and 38, respectively.

In the following description, it is assumed that the communication devices 10, 20 and 30 operate as the transmission device; the relay device, or the reception device, respectively. Further, as mentioned above, on the contrary, the communication devices 10, 20 and 30 can operate as the reception device, the relay device, and the transmission device, respectively.

An LSP path 41 and a PW path 61 are set between the communication device 10 and the communication device 30 in a direction from the communication device 10 to the communication device 30. Additionally, an LSP path 51 and a PW path 71 are set in a direction from the communication device 30 to the communication device 10. The communication device 20 relays the frame or the packet which passes on these paths. The MPLS-TP network is established by setting two pairs of paths: one is a pair of the LSP path 41 and the PW path 61 that are set in two hierarchies and the other is a pair of the LSP path 51 and the PW path 71 that are set in two hierarchies, which have different transmission direction from each other. Additionally, it is assumed that the LSP path 81 for monitoring that is set for monitoring the section from the communication device 20 to the communication device 30 is set in a direction from the communication device 20 to the communication device 30.

It is assumed that an MTU 92 of the transmission medium between the communication devices 10 and 20, and an MTU 93 of the transmission medium between the communication devices 20 and 30 are 1500 bytes. An MTU 91 that is the MTU of the transmission medium connecting the communication devices 10 and the external device, and an MTU 94 that is the MTU of the transmission medium connecting the communication devices 30 and the external device may be set separately. However, in this exemplary embodiment, they are set based on the path MTU obtained by the MTU discovery sections 15, 25 and 35 of each communication device.

The configuration of the communication devices 10, 20 and 30 is shown in FIG. 1 and FIG. 3. The communication devices include the frame transfer units 11, 21 and 31, the label tables 12, 22 and 32, the OAM processing units 13, 23 and 33, the MEP tables 14, 24 and 34, the MTU discovery sections 15, and 35, and the MTU management tables 16, 26 and 36, respectively. Further, because a detailed configuration of each communication device is the same as the configuration of the communication device shown in FIG. 1 and the FIG. 3, the description will be omitted.

The label table, the MEP table, and the MTU management table of each communication device are registered fixedly. In the first exemplary embodiment, it is assumed that these tables have already been set. However, the value of the path MTU column of the MTU management table is updated according to a process result of the MTU discovery section. There is a case in which operation of learning a relationship of the header of the frame, the port, and the PW label of the PW label tables 121, 221 and 321 in the label tables and dynamically registering them is required when some transmission technology of the Client Layer is used. In the first exemplary embodiment, the dynamic operation is allowed. In the following explanation, it is assumed that the entry required for the transfer of the frame has already been registered.

Figure 12:
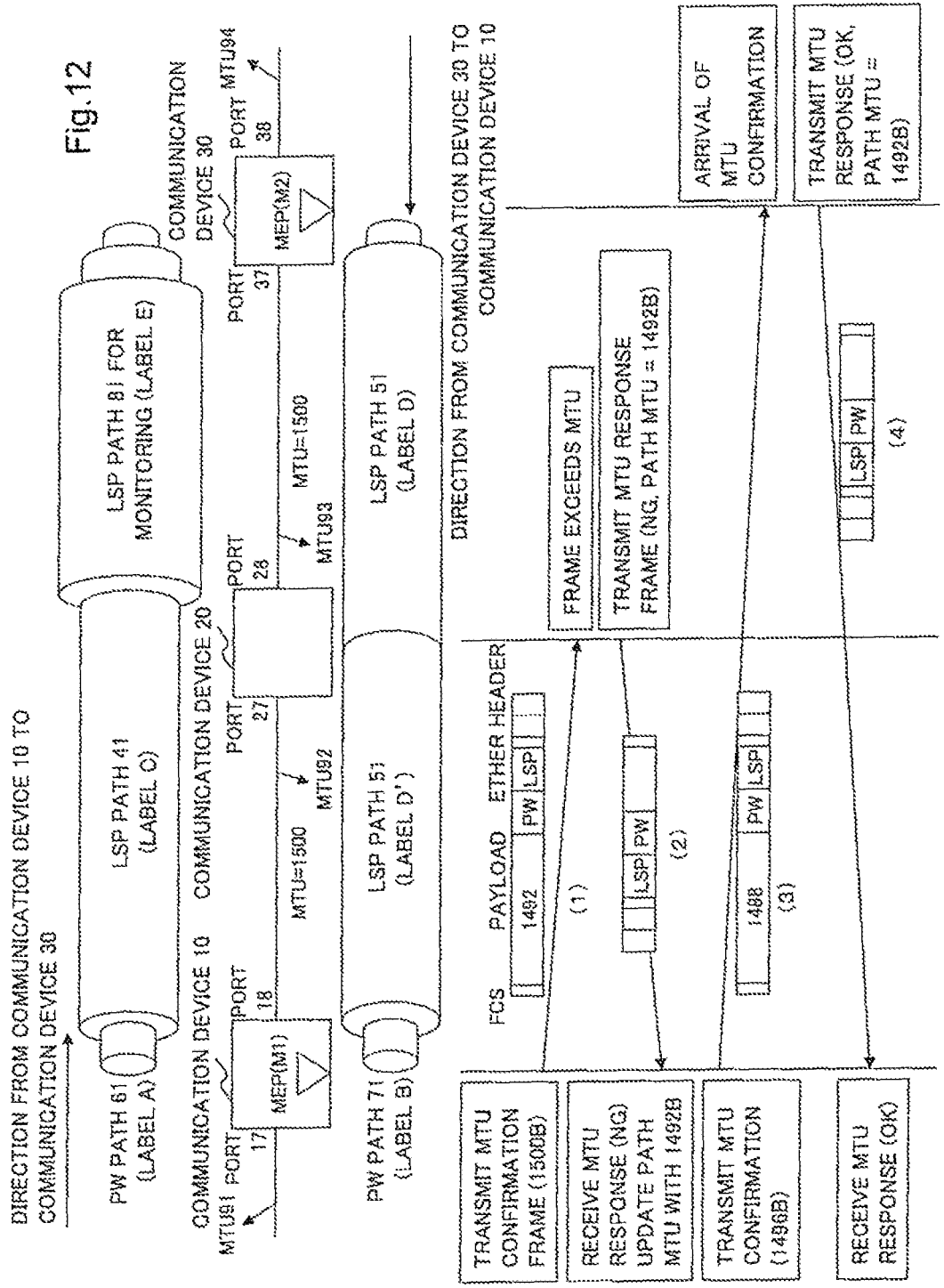
FIG. 12 is a diagram showing an outline of operation of a first exemplary embodiment.

An example of a configuration of the LSP label table, the PW label table, the MTU management table, and the MEP table of each communication device is shown in FIG. 10 and FIG. 11. An operation for discovering the path MTU of the PW path 61 will be described by using an example shown in FIG. 10 and FIG. 11. An example of the operation is shown in FIG. 12.

The operation shown in FIG. 12 (1) will be described below. The frame generation block 154 of the MTU discovery section 15 of the communication device 10 generates the MTU confirmation frame to the PW path 61. There are various timings for transmitting this MTU confirmation frame. For example, a method in which the transmission of the MTU confirmation frame is triggered when an instruction of a network operator is issued can be used. Further, a method in which when each communication device in the network is activated, the path between the communication devices is established by any protocol, and the communication between the communication devices becomes available, the MTU confirmation frame is transmitted by the communication device operating as the transmission device may be used.

Furthermore, a method in which after transmitting the MTU confirmation frame at the timing shown in the above-mentioned example, the MTU confirmation frame is periodically transmitted may be used. In this case, because a size of the path MTU can be periodically monitored, even when the path is suddenly changed, an automatic response can be implemented.

First, the frame generation block 154 of the MTU discovery section 15 refers to the MTU management table 16 (FIG. 10) and reads out the Path MTU associated with the PW path 61. In an initial state, the value (1496=1500−4) obtained by subtracting 4 that is the size of the LSP label from 1500 that is the value of the MTU 92 of the transmission medium of the port 18 is stored in this path MTU. Next, the MEP ID "M1", the opposite MEP ID "M2", and the PW label "A" that are associated with the PW path 61 are read out from the MEP table 14.

The frame generation block 154 stores an ACH (Associated Channel) header for discriminating the user data frame from the OAM frame and discriminating the MTU confirmation/response frame from the other OAM frame in addition to the path MTU, the MEP ID, and the opposite MEP ID. The frame generation block 154 generates the MTU confirmation frame padded up to a total of 1492 bytes. This MTU confirmation frame is encapsulated with the PW label "A" and it is transferred to the MPLS processing section 112 of the frame transfer unit 11. Further, when the MTU confirmation frame has been encapsulated with the PW label "A", the size of the MTU confirmation frame is a total of 1496 bytes.

The MPLS processing section 112 of the frame transfer unit 11 performs a process in accordance with the existing MPLS standard. Specifically, the MPLS processing section 112 searches for the LSP label "C" corresponding to the PW label "A" from the LSP label table 122, performs the addition (Push) of the LSP label "C", and determines the output port "18". The size of the MTU confirmation frame to which the LSP label "C" is pushed is a total of 1500 bytes. Because the size of the MTU confirmation frame is 1500 bytes and it does not exceed the MTU 92, 1500, of the transmission medium of the port 18, the header (Ether header in FIG. 12) of the transmission medium of the port 18 is added and it is transmitted to the communication device 20.

Next, the operation shown in FIG. 12 (2) will be described below. In the communication device 20 which receives the MTU confirmation frame, first, the frame transfer unit 21 removes the header (Ether header) of the transmission medium.

Next, the MPLS processing section 212 searches the LSP label table 222 by using the LSP label "C" as a key (FIG. 10). Here, because the LSP path 81 for monitoring is set between the communication device 20 and the communication device 30, the LSP label "E", the processing action "Push", and the output port "28" at the time of the transmission are obtained.

After pushing the LSP label "E" to the MTU confirmation frame according to the obtained values, the transmission availability determination block 153 of the MTU discovery section 15 refers to the MTU management table 26 and performs a comparison with the MTU 93, 1500, of the output port 28. Because the size of the MTU confirmation frame is 1504 bytes after the LSP label "E" is pushed, it exceeds the MTU 93 and it exceeds the MTU.

When it exceeds the MTU, it is determined whether the MTU confirmation frame is the OAM frame or the user data frame based on the presence/absence of the ACH header. When the ACH header is not included, it is the user data frame. In this case, it is deleted. Because the MTU confirmation frame includes the ACH header, it is determined that the MTU confirmation frame is the OAM frame. It is transferred to the OAM processing unit 23.

In the notification block 252 of the MTU discovery section 25 of the OAM processing unit 23, when the MTU confirmation frame whose size exceeds the MTU is received, the MTU response frame is generated for a response to the communication device 10 that is the transmission source of the MTU confirmation frame.

First, the size of the frame that can be transmitted from the port 28 is calculated by subtracting the size "4" of the LSP label "C" and the size "4" of the LSP label "E" for monitoring from the MTU 93 "1500" of the port 28. The value of 1492 (=1500−4−4) is obtained. This value is stored in a path MTU field in the MTU response frame. Information (transfer possibility indicating bit=1: impossible) indicating that the MTU confirmation frame cannot be transferred, an identifier "20" of this communication device, the MEP ID "M1" in the MTU confirmation frame, the opposite MEP ID "M2", and the ACH header are stored in the MTU response frame.

Next, the MEP ID "M1" in the MTU confirmation frame is taken as the opposite MEP ID, the search is performed on the MEP table 24, the PW label "B" for transfer in a direction to the communication device 10 is read out, the MTU response frame is encapsulated with this PW label "B", and it is transferred to the MPLS processing section 212 of the frame transfer unit 21.

The MPLS processing section 212 of the frame transfer unit 21 searches for the LSP label "D'" and the output port 27 from the LSP label table 222 by using the PW label "B" as a key, the LSP label "D'" is added (Pushed), the header (Ether header) of the transmission medium of the port 27 is added, and it is transmitted to the communication device 10.

The operation shown in FIG. 12 (3) will be described below. The communication device 10 receives the MTU response frame indicating that a frame is non-transferable (NG). The frame transfer unit 11 removes the header (Ether header) of the transmission medium of the MTU response frame. After that, it is determined whether the MTU response frame is the OAM frame based on the presence/absence of the ACH header and it is transferred to the OAM processing unit 13 when the MTU response frame is the OAM frame. When it is the user data frame, the MPLS processing section 112 searches the LSP label table 122 by using the LSP label "D'" as a key. After the MPLS processing section 112 removes (pops) the LSP label "D'" from the search result, it searches the PW label table 121 by using the PW label "B" as a key. Next, the MPLS processing section 112 determines the output port 17 from the search result, removes (pops) the PW label "B", adds the header (Ether header) of the transmission medium of the output port 17, and transmits it.

When the transfer possibility indicating bit stored in the MTU response frame indicates "impossible", the calculation block 151 of the MTU discovery section 15 of the OAM processing unit 13 obtains a number "61" of the related PW path from the MEP table 14 by using the MEP ID "M1" as a key. Next, the path MTU "1496" associated with the PW path 61 in the MTU management table 16 is updated with a value "1492" of the path MTU stored in the MTU response frame.

Here, the device on the path in which the MTU is exceeded can be determined by reading out the identifier of the communication device stored in the MTU response frame. In this example, because "20" is stored as the identifier of the communication device, it is known that the MTU is exceeded in the communication device 20.

A TTL (Time To Live) of the LSP label and the PW label with which the MTU confirmation/response frame is encapsulated has to be set to a value greater than the number of hops between the end point devices of the path. Further, any method for setting the number of hops can be used. As a typical method, a method in which a network operator sets it to each communication device in advance is used. Further, a method in which by using a general protocol with which all the communication devices are mutually informed of the number of hops, each communication device automatically acquires it and uses it can be used.

Figure 5:
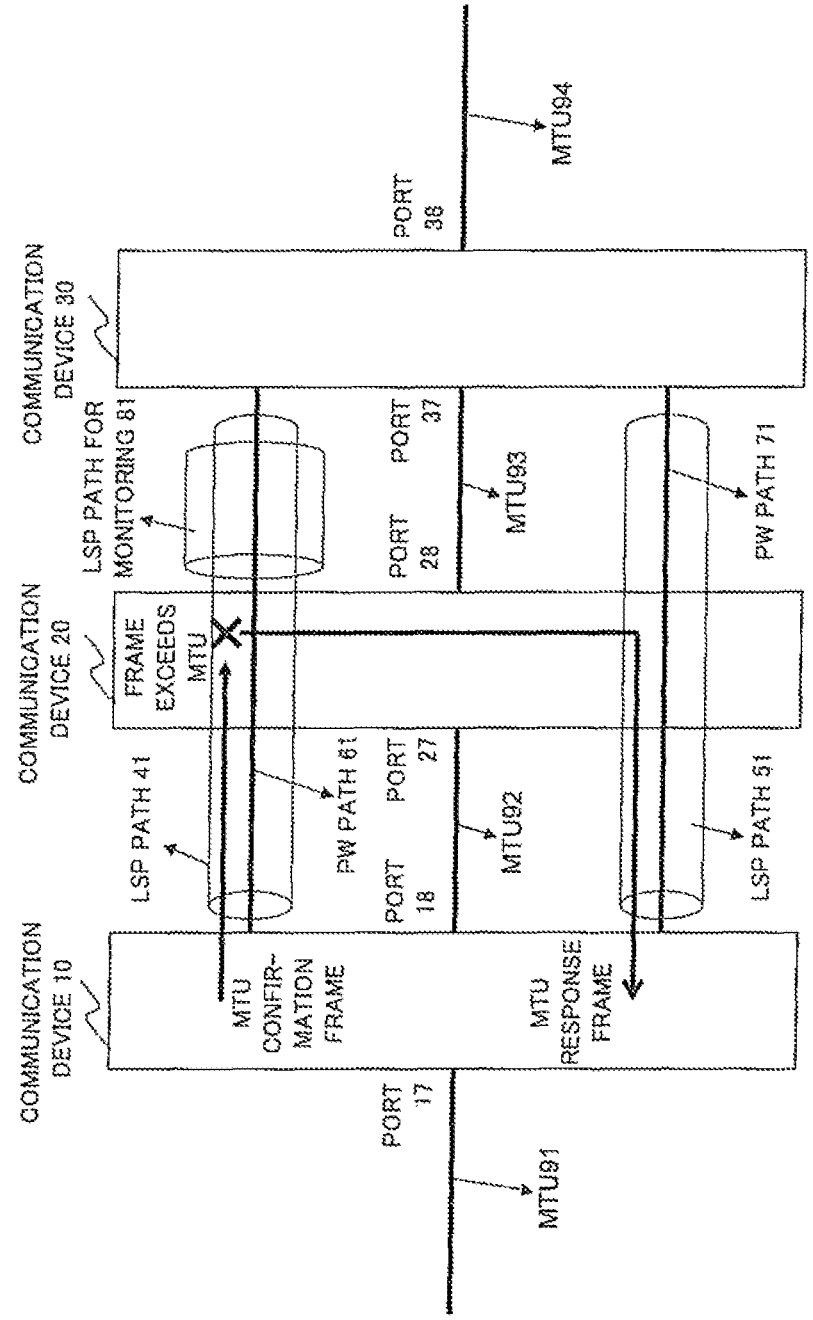
FIG. 5 is a diagram showing an outline of operation of a first exemplary embodiment.

A transfer route of the MTU confirmation/response frame is shown in FIG. 5. The communication device 10 transmits the MTU confirmation frame in order to obtain the path MTU of the PW path 61. The communication device 20 can receive the MTU confirmation frame. However, if the label of the LSP path 81 for monitoring is added, the MTU is exceeded. Therefore, the MTU confirmation frame cannot be transmitted to the communication device 30. After that, the communication device 20 transmits the MTU response frame to the communication device 10 that is the transmission source of the MTU confirmation frame.

In the process for the MTU confirmation/response frame, the path MTU from the communication device 10 to the communication device 30 that is the termination point of the PW path 61 cannot be obtained. Accordingly, by using the value of the path MTU that is newly obtained by the operation shown in FIGS. 12 (1) and (2), the MTU confirmation frame is generated again, and the discovery of the path MTU of the PW path 61 is tried. This retransmission process may be automatically started when the MTU response frame having information indicating that a frame is non-transferable is received or may be started by the operator's instruction.

The operation of this exemplary embodiment will be described by using the FIG. 12 again. First, the operation shown in FIG. 12 (3) will be described. The frame generation block 154 of the MTU discovery section 15 of the communication device 10 reads out the path MTU associated with the PW path 61 from the MTU management table 16 like the operation performed at the time of the last transmission of the MTU confirmation frame. At this time, the value of 1492 that had been updated at the time of the last process is read out.

Because the value of the path MTU is 1492, in consideration of 4 bytes that is the size of the PW label "A", the MTU confirmation frame having a total of 1488 bytes is generated in which information that is the same as that at the time of the last transmission of the MTU confirmation frame is stored. After that, the MTU confirmation frame is encapsulated with the PW label "A" and the MTU confirmation frame having 1492 bytes is transferred to the MPLS processing section 112 of the frame transfer unit 11. In the MPLS processing section 112, the LSP label "C" is pushed in a similar fashion as the last time, the header of the transmission medium of the output port 18 is added to the frame having 1496 bytes, and it is transmitted to the communication device 20.

In the communication device 20 which receives the MTU confirmation frame, the LSP label "E" for monitoring is pushed in the MPLS processing section 212 of the frame transfer unit 21 in a similar fashion as the last time. When the LSP label "E" for monitoring is pushed, the MTU confirmation frame has 1500 bytes. Accordingly, even when a comparison with the MTU 93, 1500, of the output port 28 of the MTU confirmation table 26 is performed, it does not exceed the MTU. Therefore, the MPLS processing section 212 adds the header of the transmission medium from the output port 28 that is determined by performing the label process and transmits it to the communication device 30.

Next, the operation shown in FIG. 12 (4) will be described. After the communication device 30 receives the frame, the frame transfer unit 31 eliminates the header information of the transmission medium of the port 37. Next, it is determined whether the received frame is the user data frame or the OAM frame based on the presence/absence of the ACH header. When the received frame is the OAM frame, it is transferred to the OAM processing unit 33. When the received frame is the user data frame, the PW processing section 311 and the MPLS processing section 312 refer to the PW label table 321 and the LSP label table 322, determine the output port 38, remove (Pop) the PW label "A" and the LSP label "E" and "C", add the header information on the transmission medium of the port 38, and transmits it to the next communication device.

A process performed when the frame received by the communication device 30 is the OAM frame will be described below. The OAM processing unit 33 receives the MTU confirmation frame from the frame transfer unit 31. The notification block 352 of the MTU discovery section 35 of the OAM processing unit 33 compares the opposite MEP ID "M2" in the MTU confirmation frame with the MEP ID "M2" of the device. When the opposite MEP ID is identical to the MEP ID, it is determined that the MTU confirmation frame reaches the termination point of the path and the MTU response frame is generated.

The information (transfer possibility indicating bit=0: possible) indicating that the MTU confirmation frame can be transferred, the identifier "30" of this communication device, the path MTU "1492" in the MTU confirmation frame, the MEP ID "M1", the opposite MEP ID "M2", and the ACH header are stored in the MTU response frame.

Next, the notification block 352 takes the MEP ID "M1" in the MTU confirmation frame as the opposite MEP ID, searches the MEP table 34, and reads out the PW label "B" for transfer in a direction to the communication device 10. The MTU response frame is encapsulated with this PW label "B" and transferred to the MPLS processing section 312 of the frame transfer unit 31 (FIG. 12 (4)).

The MPLS processing section 312 of the frame transfer unit 31 searches for the LSP label "D" from the LSP label table 322 by using the PW label "B" as a key. Next, based on the search result, the LSP label "D" is added (pushed), the header of the transmission medium of the port 37 is added, and the MTU response frame is transmitted to the communication device 20.

In the communication device 20, the frame transfer unit 21 performs a usual label process. Because the LSP label Of the MTU response frame received by the communication device 20 is "D", the LSP label table 222 is searched by using the input label D as a key. As a result, the output label "D'", a processing Swap, and the port 27 are obtained. The LSP label is swapped from "D" to "D'" according to this and it is transferred from the port 27 to the communication device 10.

In the communication device 10, after receiving the MTU response frame, the frame transfer unit 11 removes the header of the transmission medium like the operation shown in FIG. 12 (2). Next, it is determined whether the received frame is the OAM frame or the user frame based on the presence/absence of the ACH header and the MTU response frame is transferred to the OAM processing unit 13 when it is the OAM frame. Because a process performed when the received frame is the user frame is the same as the process shown in FIG. 12 (2), the explanation of the operation will be omitted here.

The operation performed when the OAM processing unit 13 receives the MTU response frame will be described below. Because the transfer possibility indicating bit stored in the MTU response frame indicates "possible", the calculation block 151 of the MTU discovery section 15 of the OAM processing unit 13 obtains a number. "61" of the related PW path from the MEP table 14 by using the MEP ID "M1" as a key. Next, the OAM processing unit 13 confirms that the value "1492" of the path MTU associated with the PW path 61 in the MTU management table 16 is equal to the value "1492" of the path MTU stored in the MTU response frame and ends the operation when it is confirmed.

Here, by reading out the identifier "30" of the communication device that is stored in the MTU response frame, it can be confirmed that the communication device that transmits the response is the device of the termination point of the path.

Figure 6:
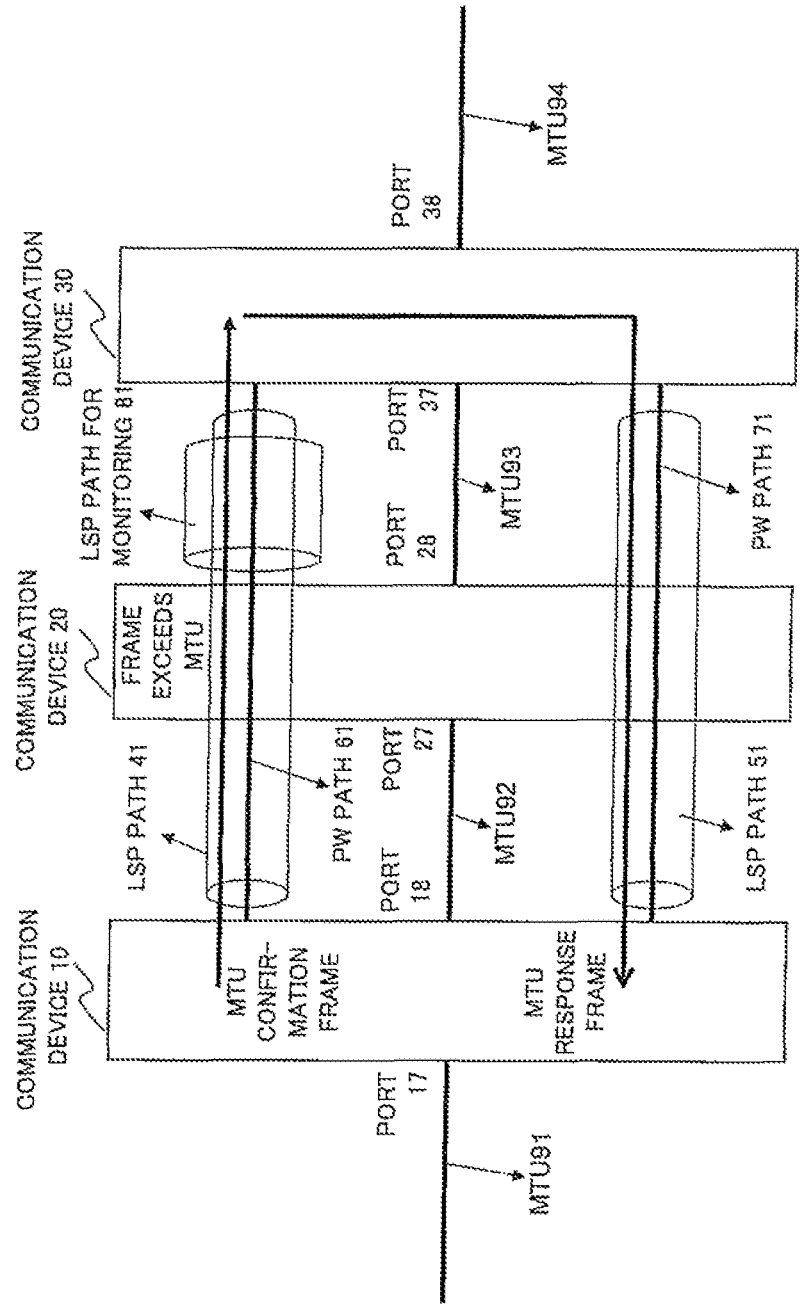
FIG. 6 is a diagram showing an outline of operation of a first exemplary embodiment.

The transfer route of the MTU confirmation/response frame is shown in FIG. 6. It is determined by the communication device 20 that the MTU confirmation frame transmitted by the communication device 10 can be transferred to the communication device 30. Therefore, it is transferred to the communication device 30. The communication device 30 receives the MTU confirmation frame and transmits the MTU response frame together with information such as the value of the path MTU and the like to the communication device 10. Here, when the communication device 10 receives the MTU response frame passing through the communication device 20, it can be known that the frame can be transmitted by using the value of the path MTU stored in the communication device 10.

The operation for discovering the path MTU of the PW path 61 has been explained above. Thus, by repeating the transmission and reception of the MTU confirmation frame and the MTU response frame, the path MTU of the PW path 61 can be discovered. The same process is performed to the PW path 71 and for both directions, the path MTU can be discovered. The path MTU of the LSP path 41 and the LSP path 51 is obtained by adding 4 bytes of the PW label to the path MTU of the PW path 61 and the PW path 71. Therefore, it is not necessary to discover the MTU for each LSP path separately.

Figure 7:
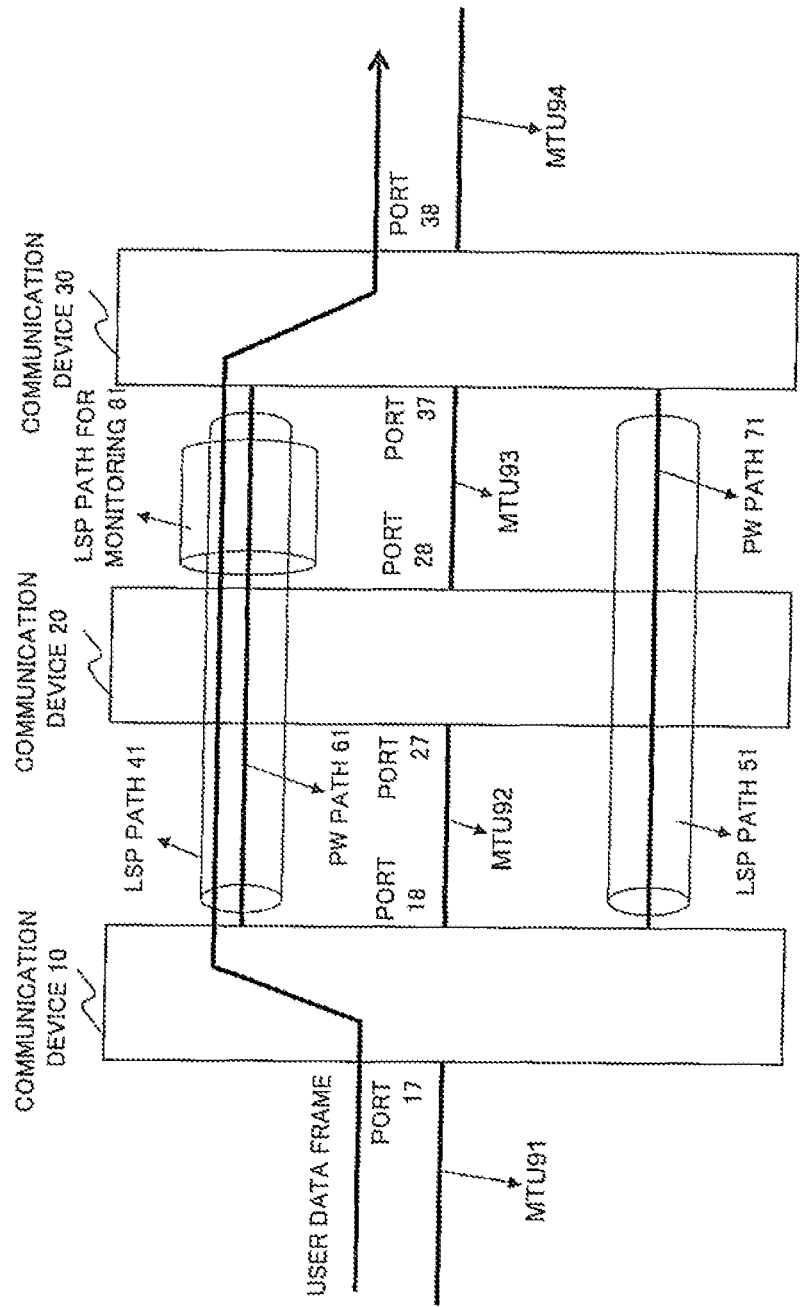
FIG. 7 is a diagram showing an outline of operation of a first exemplary embodiment.
Figure 13:
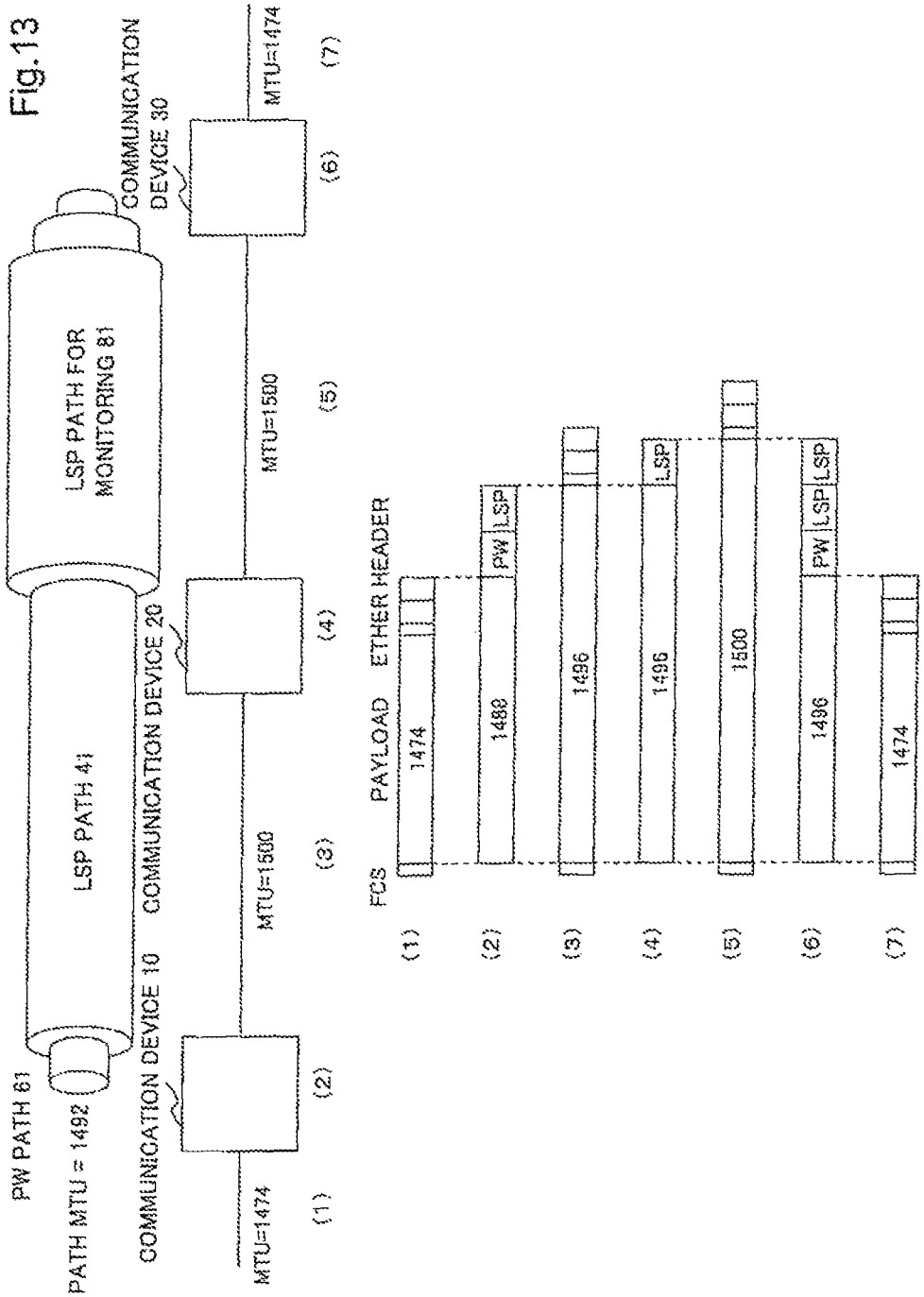
FIG. 13 is a diagram showing an outline of operation of a first exemplary embodiment.

Here, the transfer process performed when receiving the user data frame from the port 17 will be described. The frame transfer route of this case is shown in FIG. 7 and an example of operation is shown in FIG. 13.

The MTU 91 of the transmission medium of the port 17 can be obtained by subtracting the size of the PW header and the header of the transmission medium from the path MTU. For example, when the transmission medium is Ethernet, the size of the Ether header is 14 bytes (MAC SA (6 bytes)+MAC DA (6 bytes)+Type (2 bytes)). Therefore, the MTU 91 is 1474 bytes (=1492−4−14). The frame whose size does not exceed this size can be transferred on the PW path 61 without exceeding the MTU.

When the user data frame is received from the port 17, the communication device 10 refers to the MTU management table 16 and reads out the MTU 91 (1474) of the port 17. The size of the payload of the received user data frame is compared with the MTU 91 and when the size of the payload is greater than the MTU 91, the user data frame is removed and the process ends. When the size of the payload of the received user data frame is smaller than the MTU 91, it is guaranteed that this user data frame can be transferred to the communication device 30 on the PW path 61 without exceeding the MTU. Therefore, the frame transfer unit 11 performs the transfer process.

In the communication device 20 and the communication device 30 on the path, a usual transfer process for the MPLS frame is performed. Finally, the communication device 30 transmits the user data frame from the port 38 to the transmission medium at the Client Layer.

Effect of the First Exemplary Embodiment

As mentioned above, by using the first exemplary embodiment, the number of the transmissions of the OAM frame can be reduced and the path MTU discovery can be efficiently performed while maintaining high accuracy.

A reason why the first exemplary embodiment has the above-mentioned effect will be described below. First, if a method described in patent literature 2 in which while changing the size of the OAM frame by 1 byte for each frame, the path MTU is discovered is used, it is necessary to repeat the communication of the OAM frame between the path end points until the MTU can be discovered. Because the maximum allowable MTU is 65535 bytes, there is a possibility that maximum 65535 times of confirmations are required.

On the other hand, in the first exemplary embodiment, the process for the MTU confirmation/response is performed for each communication device on the path. Therefore, the number of times of the transmission of the MTU confirmation frame depends on the number of nodes. Because the maximum value of the TTL indicating an upper limit of the number of hops is 255, the maximum number of nodes on the path is 256. Accordingly, maximum 255 times of confirmations and responses is enough to discover the path MTU.

By performing the process for the MTU confirmation/response for each communication device on the path, a time required for the path MTU discovery can be reduced and the most suitable path MTU can be discovered as mentioned above.

Second Exemplary Embodiment

Hereinafter, a second exemplary embodiment of the present invention will be described by referring to FIG. 14 and FIG. 15.

Figure 15:
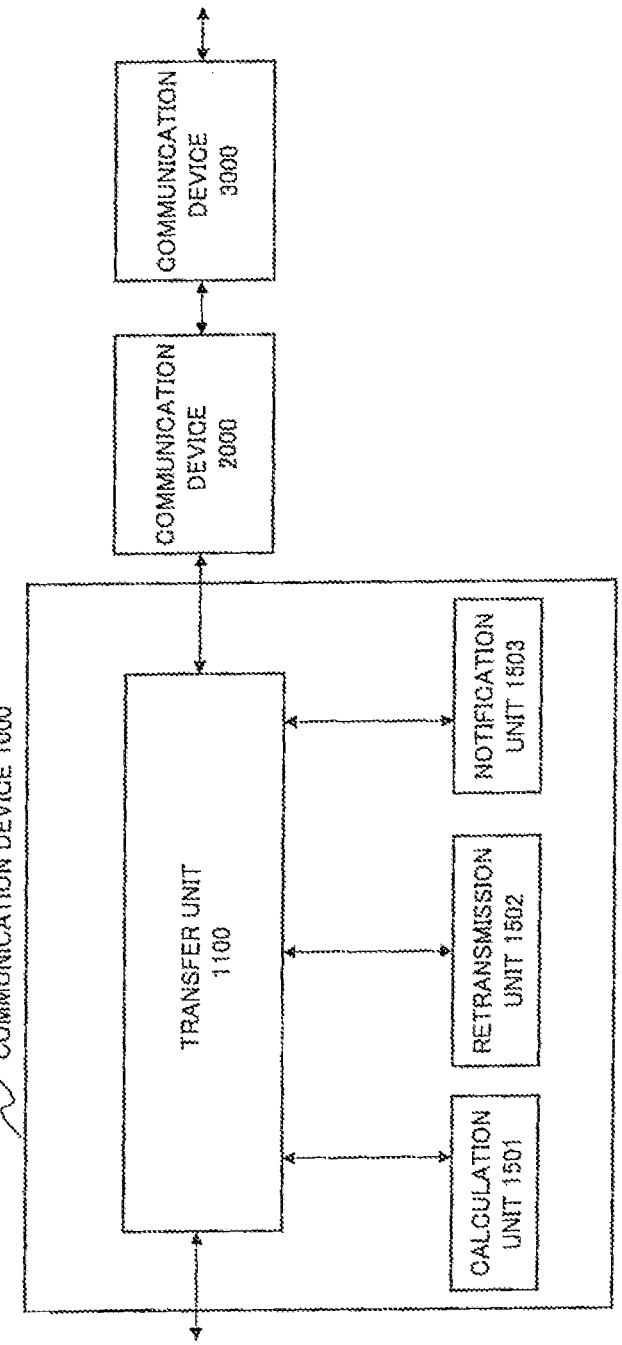
FIG. 15 is a block diagram showing a configuration of a communication device of a second exemplary embodiment.
Figure 16:
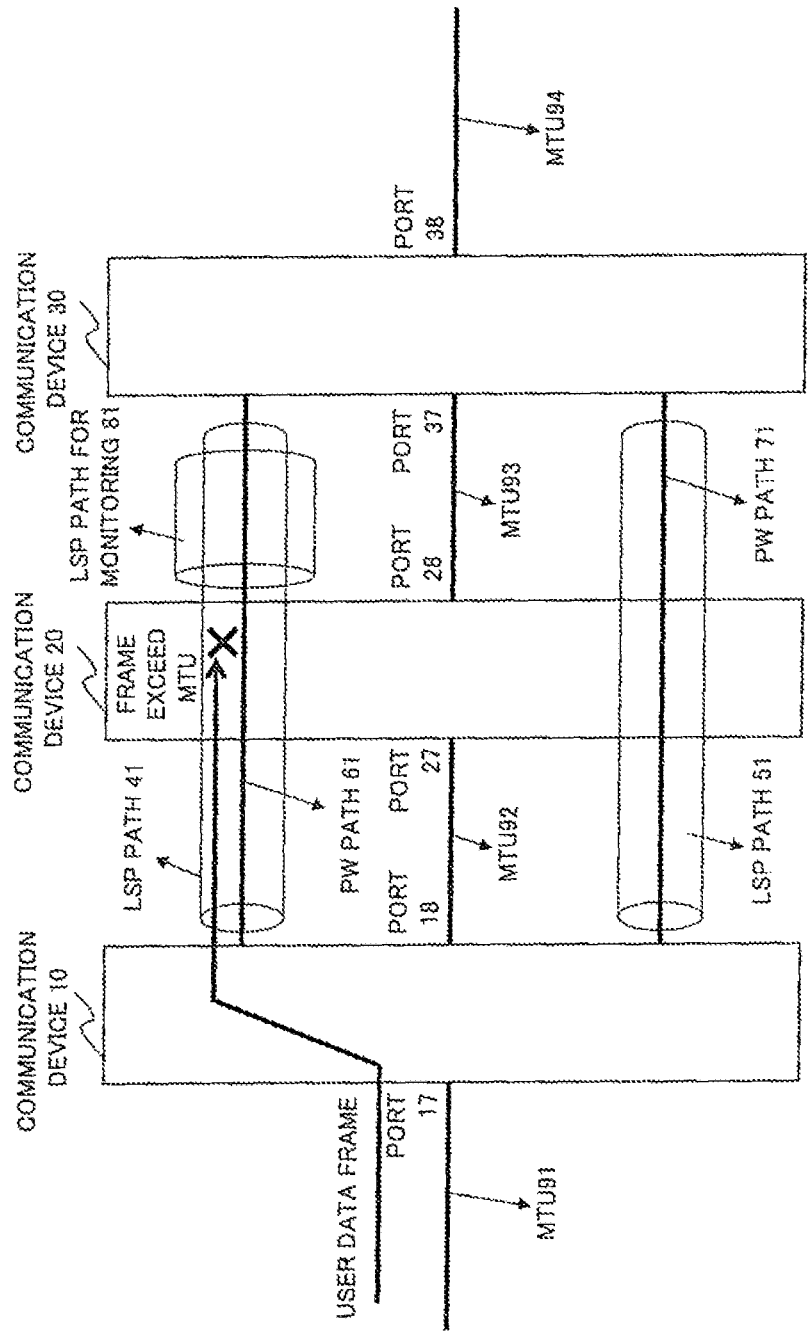
FIG. 16 is a diagram showing an outline of operation of a background art.
Figure 17:
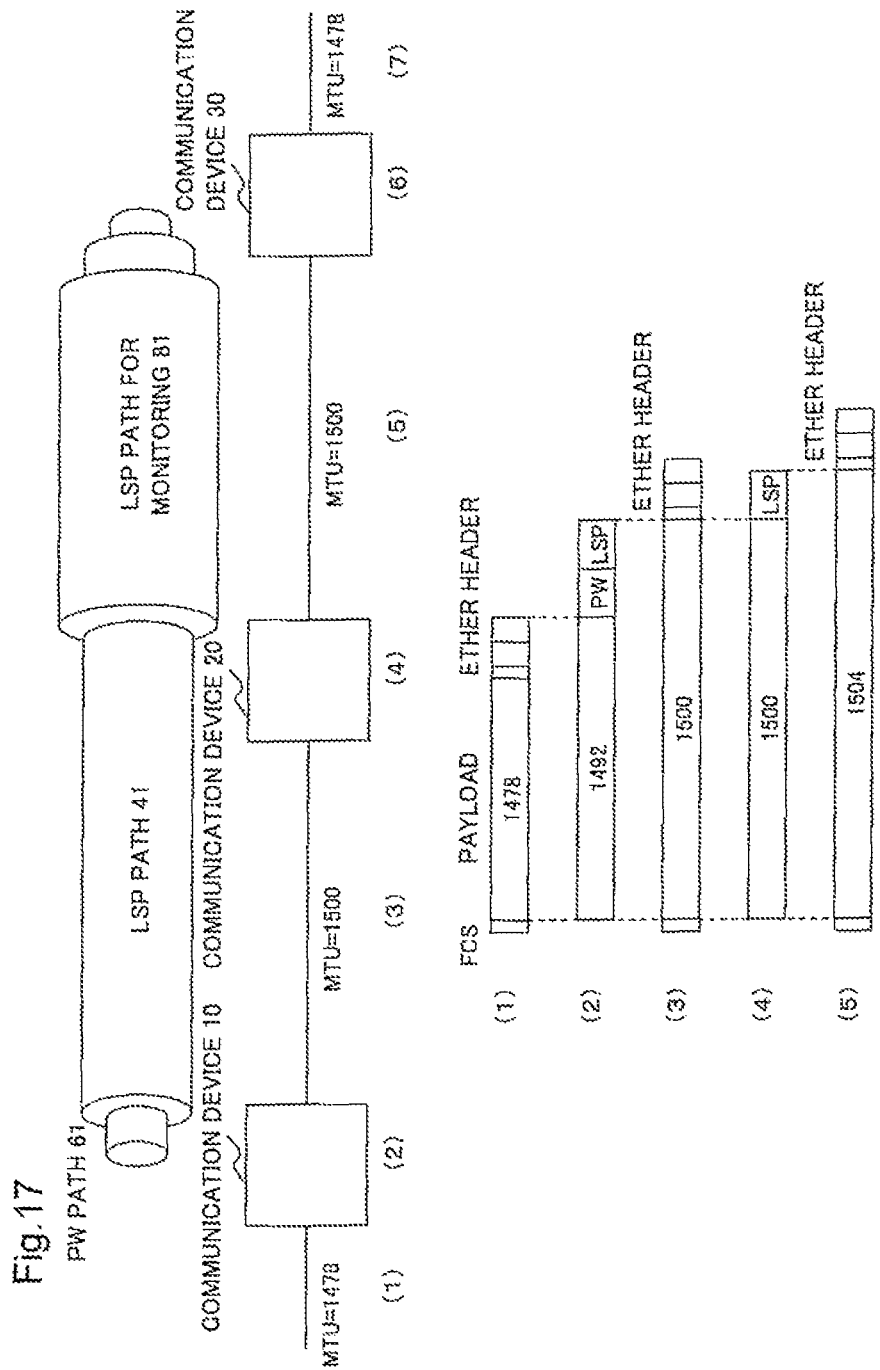
FIG. 17 is a diagram showing an outline of operation of a background art.

FIG. 15 is a block diagram showing a configuration of a communication system and a communication device according to a second exemplary embodiment. The communication system according to the second exemplary embodiment is composed of a communication device 1000, a communication device 2000, and a communication device 3000.

The configuration of the communication device 1000 will be described. The communication device 1000 is composed of a transfer unit 1100, a calculation unit 1501, a retransmission unit 1502, and a notification unit 1503. The communication device 2000 and the communication device 3000 include transfer units 2100 and 3100, storage units 2200 and 3200, calculation units 2501 and 3501, retransmission units 2502 and 3502, and notification units 2503 and 3503 (not shown in FIG. 15), respectively. Further, the configuration of the communication devices 2000 and 3000 is the same as that of the communication device 1000. Therefore, the description of them will be omitted.

The transfer unit 1100 transfers a received frame based on the identifier included in the received frame.

When the received frame is a specific frame, the calculation unit 1501 calculates a size of the received frame to which the identifier has been added.

When the size of the received frame, after the identifier is added, is larger than a transmittable size, the notification unit 1503 adds a value indicating the transmittable size or a size less than the transmittable size and generates a transmission impossible notification frame addressed to the source communication device of the received frame. After that, the notification unit 1503 transfers the generated transmission impossible notification frame to the transfer unit 1100.

When the retransmission unit 1502 receives the transmission impossible notification frame, it corrects so that the size of the specific frame is to be smaller than or equal to the transmittable size and transmits it via the transfer unit 1100.

Figure 14:
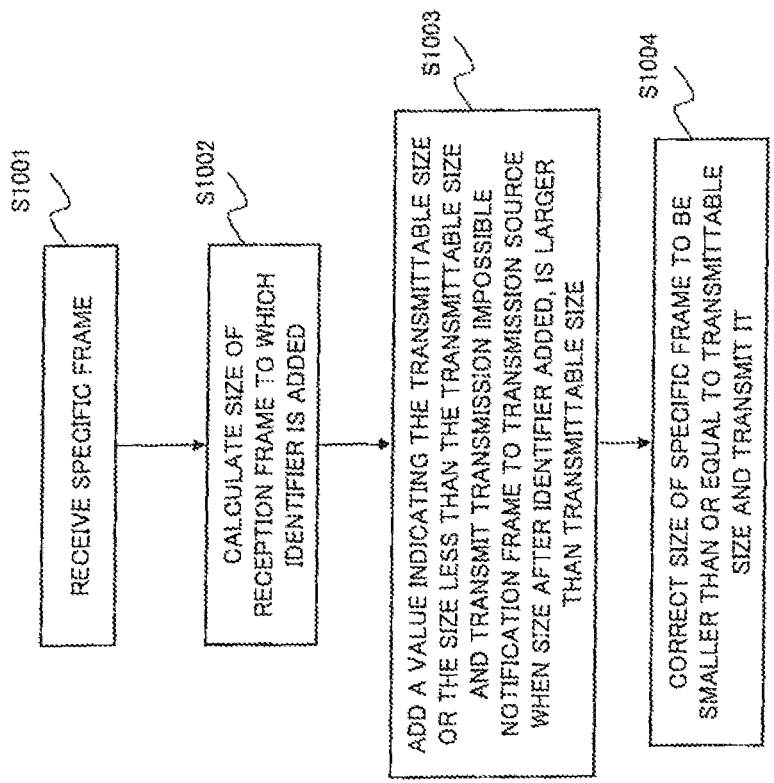
FIG. 14 is a flowchart showing an outline of operation of a second exemplary embodiment.

FIG. 14 is a flowchart showing the operation of this exemplary embodiment. Hereinafter, the operation of this exemplary embodiment will be described with reference to FIG. 14. Here, as an example, an operation in which the communication device 2000 shown in FIG. 15 receives the specific frame from the communication device 1000 will be described. However, all the communication devices can perform the same operation. Therefore, the operation is not limited to this example.

First, the communication device 2000 receives the specific frame from the communication device 1000 (step S1001).

Next, the calculation unit 2501 of the communication device 2000 calculates the size of the received frame after the identifier is added (step S1002).

Next, when the size of the received frame after the identifier is added, is larger than the transmittable size, a value indicating the transmittable size or the size less than the transmittable size is added and the transmission impossible notification frame addressed to the communication device 1000 that is the transmission source is generated, and it is transmitted via the transfer unit 1100 (step S1003).

When the communication device 1000 that is the transmission source receives the transmission impossible notification frame from the communication device 2000, it corrects the size of the specific frame to be smaller than or equal to the transmittable size that is included in the transmission impossible notification frame and transmits it via the transfer unit 1100 (step S1004).

Effect of the Second Exemplary Embodiment

In the second exemplary embodiment, the size after identifier addition of the specific frame is calculated. When the transmission to the next transfer destination is impossible, the transmission impossible notification is transmitted to the communication device that is the transmission source of the specific frame. Further, when the communication device that is the transmission source receives the transmission impossible notification, it performs correction so that the size of the specific frame is smaller than or equal to the transmittable size. The above-mentioned process is performed for each communication device. Therefore, the number of the transmissions of the specific frame can be reduced and the detection of the transmittable size of the communication path can be efficiently performed while maintaining high accuracy for the detection of the transmittable size of the communication path.

Other Exemplary Embodiments

In the first exemplary embodiment, the application to the MPLS-TP network has been described. However, the present invention may be applied to the MPLS network. The operation in the MPLS network will be described below.

When the present invention is applied to the MPLS network, the PW path does not necessarily exist and there is a possibility that the MPLS network includes only the LSP path. This can be realized by eliminating the process for the PW. For example, it can be realized by generating data of the MTU confirmation frame whose size is larger by 4 bytes without considering the encapsulation with the PW label in the MTU discovery section of a transmission side device.

In the first exemplary embodiment, a configuration in which one PW path is set to one LSP path has been shown. As another exemplary embodiment, the present invention can be applied to a configuration in which a plurality of PW paths is set to one LSP path. These PW paths use the same transfer path. Therefore, when an MTU discovery process is performed to any one of the PW paths, the MTU of the plurality of PW paths which is set to one LSP path can be discovered.

Further, in the first exemplary embodiment, a configuration in which the communication device has a pair of LSP paths has been explained. However, there is no limitation to the number of the LSP paths and the number of the PW paths that can be established to the communication device. When many LSP paths and PW paths are set between the communication devices, the same transfer path is used for them. Therefore, as mentioned above, the MTU discovery process to any one of the PW paths is enough to discover the path MTU.

Problem of the Background Art

The Path MTU Discovery protocol described in patent literature 1 that has been explained in the background art is used on the premise that it is used in the IP layer. Further, it is difficult to simply apply the Path MTU Discovery protocol to the MPLS-TP.

The Path MTU Discovery protocol is used on the premise that each communication device grasps the MTU value of each section in advance. Therefore, when the Path MTU Discovery protocol is applied to the MPLS-TP, by considering the number of stacked labels and the MTU size in all the sections of the path, an operation for adjusting the MTU of the Client Layer of the transmission source node is needed in order to prevent a state in which the end-to-end transfer cannot be performed. When a section in which the number of stacked labels and the MTU cannot be known by the transmission source node exists, this problem cannot be solved.

By using the technology described in patent literature 2 that has been explained in the background art, the length of the frame which cannot be transferred between the end points can be detected. However, the technology described in patent literature 2 has the following problems.

(1) In order to detect the length of the frame that cannot be transferred with high accuracy, as mentioned above, it is necessary to change the size of the CCM frame by 1 byte for each frame and transmit it. However, it takes much time to detect it.

(2) When the size of the CCM frame is changed by more than 1 byte (for example, 2 bytes, 4 bytes, or the like) for each frame and transmitted, the time required for the detection is shortened. However, this results in low detection accuracy.

Accordingly, a problem is to shorten the detection time while maintaining high accuracy for the detection of the length of the frame that can be transferred.

Effect of the Present Invention

As an example of the effect of the present invention, the present invention has an advantage in which the end-to-end MTU value of the communication path can be obtained with high accuracy and at high speed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

A communication device comprising:

a transfer unit transferring a received frame based on an identifier included in the received frame;

a calculation unit calculating a size of the received frame to which the identifier is added when the received frame is a specific frame;

a notification unit adding a value indicating a transmittable size or a size less than the transmittable size, when the size of the received frame after the identifier added is larger than the size that can be transmitted to a next destination communication device on a communication path, generating a transmission impossible notification frame addressed to a source communication device of the received frame, and transferring the transmission impossible notification frame to the transfer unit; and a retransmission unit correcting the size of the specific frame to be smaller than or equal to the transmittable size, when the transmission impossible notification frame is received and transferring the transmission impossible notification frame to the transfer unit.

(Supplementary Note 2)

The communication device according to supplementary note 1 further comprising:

a transmittable size storage unit storing the value indicating the transmittable size or a size less than the transmittable size stored in the transmission impossible notification frame, when the transmission impossible notification frame is received; and a transmission availability determination unit comparing the transmittable size with the size of the received frame after the identifier added, by referring to the transmittable size storage unit, and determining whether the size of the received frame after the identifier added is the transmittable size.

(Supplementary Note 3)

The communication device according to supplementary note 2, further comprising an identifier management unit associating a first identifier with a second identifier, wherein both of the first identifier and the second identifier indicate a transfer destination of the specific frame, and managing the first identifier and the second identifier, wherein the calculation unit searches for the second identifier, which is newly added to the received frame, from the identifier management unit based on the first identifier added to the received frame, adds the second identifier to the received frame, and calculates as the size after the identifier added.

(Supplementary Note 4)

The communication device according to supplementary note 2 or 3, wherein the notification unit takes a value obtained by subtracting the size of the first identifier and the size of the second identifier from the transmittable size, as the value indicating the transmittable size or the size less than the transmittable size.

(Supplementary Note 5)

The communication device according to any one of supplementary notes 1 to 4, further comprising a source and destination management unit associating an identifier of a source communication device of the specific frame with an identifier of a destination communication device, and managing the identifier of the source communication device and the identifier of the destination communication device, wherein the retransmission unit obtains the identifier of the communication path from the source and destination management unit based on the identifier of the source communication device, which is added to the transmission impossible notification frame.

(Supplementary Note 6)

The communication device according to any one of supplementary notes 1 to 5, wherein the retransmission unit replaces the transmittable size of the communication path that is associated with the identifier of the communication path in the transmittable size storage unit with the value indicating the transmittable size or the size less than the transmittable size which is stored in the transmission impossible notification frame, and uses it as the size of the specific frame.

(Supplementary Note 7)

The communication device according to any one of supplementary notes 1 to 6, further comprising:

a transmission possible notification unit comparing the identifier of the destination communication device which is stored in the received frame with the identifier of the communication device, generating a transmission possible notification frame addressed to the source communication device when the identifier of the destination communication device and the identifier of the communication device are the same, and transferring the transmission possible notification frame to the transfer unit.

(Supplementary Note 8)

A communication method comprising:

transferring a received frame based on an identifier included in the received frame;

calculating a size of the received frame to which the identifier is added when the received frame is a specific frame;

adding a value indicating a transmittable size or a size less than the transmittable size, when the size of the received frame after the identifier added is larger than the size that can be transmitted to a next destination communication device on a communication path;

generating a transmission impossible notification frame addressed to a source communication device of the received frame and transferring the transmission impossible notification frame; and correcting the size of the specific frame to be smaller than or equal to the transmittable size, when the transmission impossible notification frame is received and transferring the transmission impossible notification frame.

(Supplementary Note 9)

The communication method according to supplementary note 8, further comprising:

storing the value indicating the transmittable size or the size less than the transmittable size stored in the transmission impossible notification frame in a transmittable size storage unit, when the transmission impossible notification frame is received;

comparing the transmittable size with the size of the received frame after the identifier added, by referring to the transmittable size storage unit; and determining whether the size of the received frame after the identifier added is the transmittable size.

(Supplementary Note 10)

The communication method according to supplementary note 9, further comprising:

searching a second identifier, which is newly added to the received frame, from an identifier management unit, based on the first identifier added to the received frame;

adding the second identifier to the received frame; and calculating as the size after the identifier added, wherein the associating and managing a first identifier with the second identifier, wherein both of the first identifier and the second identifier indicate a transfer destination of the specific frame.

(Supplementary Note 11)

The communication method according to supplementary note 9 or 10, wherein a value obtained by subtracting a size of the first identifier and a size of the second identifier from the transmittable size is taken as the value indicating the transmittable size or the size less than the transmittable size of the transmission impossible notification frame.

(Supplementary Note 12)

The communication method according to any one of supplementary notes 8 to 11, further comprising obtaining the identifier of the communication path from a transmission source and destination management unit, based on the identifier of the source communication device which is added to the transmission impossible notification frame, wherein the transmission source and destination management unit associates and manages the identifier of the source communication device of the specific frame with the identifier of a destination communication device.

(Supplementary Note 13)

The communication method according to any one of supplementary notes 8 to 12, further comprising:

replacing the transmittable size of the communication path which is associated with the identifier of the communication path of the transmittable size storage unit with the value indicating the transmittable size or the size less than the transmittable size stored in the transmission impossible notification frame and used as the size of the specific frame.

(Supplementary Note 14)

The communication method according to any one of supplementary notes 8 to 13, further comprising:

comparing the identifier of the destination communication device stored in the received frame with the identifier of the communication device;

generating the transmission possible notification frame addressed to the source communication device when both of the identifier of the destination communication device and the identifier of the communication device are the same; and transferring the generated transmission possible notification frame.

(Supplementary Note 15)

A recording medium for recording a communication program comprising:

a transfer process transferring a received frame based on an identifier included in the received frame;

a calculation process calculating a size of the received frame to which the identifier is added when the received frame is a specific frame;

a notification process adding a value indicating a transmittable size or a size less than the transmittable size, when the size of the received frame after the identifier added is larger than the size that can be transmitted to a next destination communication device on a communication path, generating a transmission impossible notification frame addressed to a source communication device of the received frame, and transferring the transmission impossible notification frame by a transfer process; and a retransmission process correcting the size of the specific frame to be smaller than or equal to the transmittable size, when the transmission impossible notification frame is received and transferring the transmission impossible notification frame in the transfer process.

(Supplementary Note 16)

The recording medium for recording a communication program according to supplementary note 15, further comprising:

a transmittable size storage process storing the value indicating the transmittable size or the size less than the transmittable size stored in the transmission impossible notification frame in a transmittable size storage unit when the transmission impossible notification frame is received; and a transmission availability determination process comparing the transmittable size with the size of the received frame after the identifier added, by referring to the transmittable size storage unit and determining whether the size of the received frame after the identifier added is the transmittable size.

(Supplementary Note 17)

The recording medium for recording a communication program according to supplementary note 16, wherein the calculation process searches a second identifier, which is newly added to the received frame, from an identifier management unit, based on the first identifier added to the received frame and adds the second identifier to the received frame and calculates as the size after the identifier added; and wherein the associating and managing a first identifier with the second identifier, wherein both of the first identifier and the second identifier indicate a transfer destination of the specific frame.

(Supplementary Note 18)

The recording medium for recording a communication program according to supplementary note 16 or 17, wherein in the notification process, a value obtained by subtracting a size of the first identifier and a size of the second identifier from the transmittable size is taken as the value indicating the transmittable size or the size less than the transmittable size of the transmission impossible notification frame.

(Supplementary Note 19)

The recording medium for recording a communications program according to any one of supplementary notes 16 to 18, wherein the retransmission process obtains the identifier of the communication path from a transmission source and destination management unit, based on the identifier of the source communication device which is added to the transmission impossible notification frame; and
wherein the transmission source and destination management unit associates and manages the identifier of the source communication device of the specific frame with the identifier of a destination communication device.

(Supplementary note 20).

The recording medium for recording a communication program according to any one of supplementary notes 15 to 19,
wherein the retransmission process replaces the transmittable size of the communication path which is associated with the identifier of the communication path of the transmittable size storage unit with the value indicating the transmittable size or the size less than the transmittable size stored in the transmission impossible notification frame and used as the size of the specific frame.

(Supplementary Note 21)

The recording medium for recording a communication program according to any one of supplementary notes 15 to 20, further comprising:
a transmission possible notification process comparing the identifier of the destination communication device that is stored in the received frame with the identifier of the communication device, generating the transmission possible notification frame addressed to the source communication device when both of the identifier of the destination communication device and the identifier of the communication device are the same, and transferring the generated transmission possible notification frame in the transfer step.

(Supplementary Note 22)

A communication device comprising:
a transfer means for transferring a received frame based on an identifier included in the received frame;
a calculation means for calculating a size of the received frame to which the identifier is added when the received frame is a specific frame;
a notification means for adding a value indicating a transmittable size or a size less than the transmittable size, when the size of the received frame after the identifier added is larger than the size that can be transmitted to a next destination communication device on a communication path, for generating a transmission impossible notification frame addressed to a source communication device of the received frame, and for transferring the transmission impossible notification frame to the transfer means; and
a retransmission means for correcting the size of the specific frame to be smaller than or equal to the transmittable size, when the transmission impossible notification frame is received and transferring the transmission impossible notification frame to the transfer means.

The invention claimed is:

1. A communication device comprising:
a transfer unit transferring a received frame based on an identifier included in the received frame;
a calculation unit calculating a size of the received frame to which the identifier is added when the received frame is a specific frame;
a notification unit adding a value indicating a transmittable size or a size less than the transmittable size, when the size of the received frame after the identifier added is larger than the size that can be transmitted to a next destination communication device on a communication path, generating a transmission impossible notification frame addressed to a source communication device of the received frame, and transferring the transmission impossible notification frame to the transfer unit;
a retransmission unit correcting the size of the specific frame to be smaller than or equal to the transmittable size, when the transmission impossible notification frame is received, and transferring the specific frame having been corrected to the transfer unit for retransmission;
a transmittable size storage unit storing the value indicating the transmittable size or a size less than the transmittable size stored in the transmission impossible notification frame, when the transmission impossible notification frame is received; and
a transmission availability determination unit comparing the transmittable size with the size of the received frame after the identifier added, by referring to the transmittable size storage unit, and determining whether the size of the received frame after the identifier added is the transmittable size.

2. The communication device according to claim 1, further comprising an identifier management unit associating a first identifier with a second identifier, wherein both of the first identifier and the second identifier indicate a transfer destination of the specific frame, and managing the first identifier and the second identifier,
wherein the calculation unit searches for the second identifier, which is newly added to the received frame, from the identifier management unit based on the first identifier added to the received frame, adds the second identifier to the received frame, and calculates as the size after the identifier added.

3. The communication device according to claim 1,
wherein the notification unit takes a value obtained by subtracting the size of the first identifier and the size of the second identifier from the transmittable size, as the value indicating the transmittable size or the size less than the transmittable size.

4. The communication device according to claim 1,
wherein the retransmission unit replaces the transmittable size of the communication path that is associated with the identifier of the communication path in the transmittable size storage unit with the value indicating the transmittable size or the size less than the transmittable size which is stored in the transmission impossible notification frame, and uses it as the size of the specific frame.

5. The communication device according to claim 1, further comprising:
a transmission possible notification unit comparing the identifier of the destination communication device which is stored in the received frame with the identifier of the communication device, generating a transmission possible notification frame addressed to the source communication device when the identifier of the destination communication device and the identifier of the communication device are the same, and transferring the transmission possible notification frame to the transfer unit.

6. A communication device comprising:
a transfer unit transferring a received frame based on an identifier included in the received frame;
a calculation unit calculating a size of the received frame to which the identifier is added when the received frame is a specific frame;
a notification unit adding a value indicating a transmittable size or a size less than the transmittable size, when the size of the received frame after the identifier added is larger than the size that can be transmitted to a next destination communication device on a communication path, generating a transmission impossible notification frame addressed to a source communication device of the received frame, and transferring the transmission impossible notification frame to the transfer unit;

a retransmission unit correcting the size of the specific frame to be smaller than or equal to the transmittable size, when the transmission impossible notification frame is received, and transferring the specific frame having been corrected to the transfer unit for retransmission;

a source and destination management unit associating an identifier of a source communication device of the specific frame with an identifier of a destination communication device, and managing the identifier of the source communication device and the identifier of the destination communication device, wherein the retransmission unit obtains the identifier of the communication path from the source and destination management unit based on the identifier of the source communication device, which is added to the transmission impossible notification frame.

7. A communication method comprising:

transferring a received frame based on an identifier included in the received frame;

calculating a size of the received frame to which the identifier is added when the received frame is a specific frame;

adding a value indicating a transmittable size or a size less than the transmittable size, when the size of the received frame after the identifier added is larger than the size that can be transmitted to a next destination communication device on a communication path, generating a transmission impossible notification frame addressed to a source communication device of the received frame and transferring the transmission impossible notification frame;

correcting the size of the specific frame to be smaller than or equal to the transmittable size, when the transmission impossible notification frame is received and transferrin the specific frame having been corrected for retransmission;

storing the value indicating the transmittable size or the size less than the transmittable size stored in the transmission impossible notification frame in a transmittable size storage unit, when the transmission impossible notification frame is received;

comparing the transmittable size with the size of the received frame after the identifier added, by referring to the transmittable size storage unit; and determining whether the size of the received frame after the identifier added is the transmittable size.

8. The communication method according to claim 7, further comprising:

searching a second identifier, which is newly added to the received frame, from an identifier management unit, based on the first identifier added to the received frame;

adding the second identifier to the received frame; and calculating as the size after the identifier added, wherein the associating and managing a first identifier with the second identifier, wherein both of the first identifier and the second identifier indicate a transfer destination of the specific frame.

9. The communication method according to claim 7, wherein a value obtained by subtracting a size of the first identifier and a size of the second identifier from the transmittable size is taken as the value indicating the transmittable size or the size less than the transmittable size of the transmission impossible notification frame.

10. The communication method according to claim 7, further comprising:

replacing the transmittable size of the communication path which is associated with the identifier of the communication path of the transmittable size storage unit with the value indicating the transmittable size or the size less than the transmittable size stored in the transmission impossible notification frame and used as the size of the specific frame.

11. The communication method according to claim 7, further comprising:

comparing the identifier of the destination communication device stored in the received frame with the identifier of the communication device;

generating the transmission possible notification frame addressed to the source communication device when both of the identifier of the destination communication device and the identifier of the communication device are the same; and transferring the generated transmission possible notification frame.

12. A communication method comprising:

transferring a received frame based on an identifier included in the received frame;

calculating a size of the received frame to which the identifier is added when the received frame is a specific frame;

adding a value indicating a transmittable size or a size less than the transmittable size, when the size of the received frame after the identifier added is larger than the size that can be transmitted to a next destination communication device on a communication path;

generating a transmission impossible notification frame addressed to a source communication device of the received frame and transferring the transmission impossible notification frame;

correcting the size of the specific frame to be smaller than or equal to the transmittable size, when the transmission impossible notification frame is received and transferring the specific frame having been corrected for retransmission;

obtaining the identifier of the communication path from a transmission source and destination management unit, based on the identifier of the source communication device which is added to the transmission impossible notification frame, wherein the transmission source and destination management unit associates and manages the identifier of the source communication device of the specific frame with the identifier of a destination communication device.

13. A non-transitory computer-readable recording medium for recording a communication program which executed by a computer, causes the computer to perform:

a transfer process transferring a received frame based on an identifier included in the received frame;

a calculation process calculating a size of the received frame to which the identifier is added when the received frame is a specific frame;

a notification process adding a value indicating a transmittable size or a size less than the transmittable size, when the size of the received frame after the identifier added is larger than the size that can be transmitted to a next destination communication device on a communication path, generating a transmission impossible notification frame addressed to a source communication device of the received frame, and transferring the transmission impossible notification frame by a transfer process;

a retransmission process correcting the size of the specific frame to be smaller than or equal to the transmittable size, when the transmission impossible notification frame is received and transferrin the specific frame having been corrected for retransmission in the transfer process;

a transmittable size storage process storing the value indicating the transmittable size or the size less than the transmittable size stored in the transmission impossible notification frame in a transmittable size storage unit when the transmission impossible notification frame is received; and a transmission availability determination process comparing the transmittable size with the size of the received frame after the identifier added, by referring to the transmittable size storage unit and determining whether the size of the received frame after the identifier added is the transmittable size.

14. The non-transitory computer-readable recording medium for recording a communication program according to claim 13,
wherein the calculation process searches a second identifier, which is newly added to the received frame, from an identifier management unit, based on the first identifier added to the received frame and adds the second identifier to the received frame and calculates as the size after the identifier added; and
wherein the associating and managing a first identifier with the second identifier, wherein both of the first identifier and the second identifier indicate a transfer destination of the specific frame.

15. The non-transitory computer-readable recording medium for recording a communication program according to claim 13,
wherein in the notification process, a value obtained by subtracting a size of the first identifier and a size of the second identifier from the transmittable size is taken as the value indicating the transmittable size or the size less than the transmittable size of the transmission impossible notification frame.

16. The non-transitory computer-readable recording medium for recording a communication program according to claim 13,
wherein the retransmission process obtains the identifier of the communication path from a transmission source and destination management unit, based on the identifier of the source communication device which is added to the transmission impossible notification frame; and
wherein the transmission source and destination management unit associates and manages the identifier of the source communication device of the specific frame with the identifier of a destination communication device.

17. The non-transitory computer-readable recording medium for recording a communication program according to claim 13,
wherein the retransmission process replaces the transmittable size of the communication path which is associated with the identifier of the communication path of the transmittable size storage unit with the value indicating the transmittable size or the size less than the transmittable size stored in the transmission impossible notification frame and used as the size of the specific frame.

* * * * *